US009621933B2

(12) United States Patent
Phillips et al.

(10) Patent No.: US 9,621,933 B2
(45) Date of Patent: Apr. 11, 2017

(54) SYSTEM AND METHOD FOR PROVIDING VOD CONTENT IN A SWITCHED DIGITAL VIDEO NETWORK USING UNICAST ABR STREAMING

(71) Applicant: Ericsson AB, Stockholm (SE)

(72) Inventors: Chris Phillips, Hartwell, GA (US); Jennifer Ann Reynolds, Duluth, GA (US); Robert Hammond Forsman, Sugar Hill, GA (US)

(73) Assignee: ERICSSON AB, Stockholm (SE)

( * ) Notice: Subject to any disclaimer, the term of this patent is extended or adjusted under 35 U.S.C. 154(b) by 0 days.

(21) Appl. No.: 14/671,025

(22) Filed: Mar. 27, 2015

(65) Prior Publication Data

US 2016/0286249 A1 Sep. 29, 2016

(51) Int. Cl.
*H04N 7/173* (2011.01)
*H04N 21/2385* (2011.01)
(Continued)

(52) U.S. Cl.
CPC ..... *H04N 21/2385* (2013.01); *H04N 21/2381* (2013.01); *H04N 21/2402* (2013.01); *H04N 21/2662* (2013.01); *H04N 21/47202* (2013.01); *H04N 21/6373* (2013.01); *H04N 21/64738* (2013.01)

(58) Field of Classification Search
None
See application file for complete search history.

(56) References Cited

U.S. PATENT DOCUMENTS 6,292,834 B1   9/2001  Ravi et al.
8,762,564 B1 * 6/2014  Philpott ............. H04L 65/4084
                                                    709/217
(Continued)

FOREIGN PATENT DOCUMENTS

WO    WO 2014/063726 A1    5/2014

OTHER PUBLICATIONS

U.S. Appl. No. 14/670,888, filed Mar. 27, 2015, Phillips, et al.
(Continued)

*Primary Examiner* — William J Kim

(57) ABSTRACT

A system and method for providing VOD/NPVR content in a switched digital video network using unicast adaptive bitrate (ABR) streaming. In one implementation, upon receiving a notification from a back office pursuant to the VOD session request from a subscriber station (e.g., a set-top box or STB), a bandwidth pipe modeling process is operative to model a bandwidth pipe corresponding to each edge QAM device configured to support VOD sessions for selecting a particular edge QAM device that can best accommodate the requested VOD session. Bitrates of UABR streams of existing VOD sessions of the selected edge QAM device may be adjusted in order to accommodate a particular UABR stream at a chosen bitrate for the requested VOD session. UABR allocations of the selected edge QAM's bandwidth pipe may be effectuated for the existing VOD sessions and the requested VOD session as needed. A response message including one or more session frequencies, if the session request is accommodated, may be transmitted to the requesting subscriber station.

17 Claims, 22 Drawing Sheets

(51) Int. Cl.

| | | |
|---|---|---|
| *H04N 21/6373* | (2011.01) | |
| *H04N 21/472* | (2011.01) | |
| *H04N 21/647* | (2011.01) | |
| *H04N 21/2381* | (2011.01) | |
| *H04N 21/24* | (2011.01) | |
| *H04N 21/2662* | (2011.01) | |

(56) References Cited

U.S. PATENT DOCUMENTS

| | | | |
|---|---|---|---|
| 9,264,508 B2 | 2/2016 | Wolf et al. | |
| 2005/0289618 A1 | 12/2005 | Hardin | |
| 2008/0037420 A1 | 2/2008 | Tang | |
| 2008/0201748 A1 | 8/2008 | Hasek et al. | |
| 2008/0229379 A1 | 9/2008 | Akhter | |
| 2008/0288979 A1 | 11/2008 | Smoyer et al. | |
| 2009/0025027 A1* | 1/2009 | Craner | H04H 20/103 725/32 |
| 2009/0031384 A1* | 1/2009 | Brooks | H04N 21/23439 725/127 |
| 2009/0100459 A1* | 4/2009 | Riedl | H04N 21/2385 725/35 |
| 2009/0150943 A1* | 6/2009 | Vasudevan | H04N 21/2385 725/86 |
| 2009/0222872 A1 | 9/2009 | Schlack | |
| 2010/0086020 A1* | 4/2010 | Schlack | H04L 67/322 375/240.01 |
| 2011/0072474 A1 | 3/2011 | Springer et al. | |
| 2011/0119703 A1 | 5/2011 | Schlack et al. | |
| 2011/0188439 A1* | 8/2011 | Mao | H04N 7/17318 370/312 |
| 2011/0197239 A1* | 8/2011 | Schlack | H04L 41/0896 725/95 |
| 2011/0255555 A1* | 10/2011 | Alexander | H04N 21/23805 370/468 |
| 2012/0317604 A1 | 12/2012 | Stallard | |
| 2012/0331513 A1* | 12/2012 | Yamagishi | H04N 21/2362 725/95 |
| 2013/0024904 A1 | 1/2013 | Levine et al. | |
| 2013/0091521 A1* | 4/2013 | Phillips | H04N 21/23424 725/35 |
| 2014/0230003 A1* | 8/2014 | Ma | H04N 21/231 725/115 |
| 2014/0282766 A1* | 9/2014 | Good | H04L 65/607 725/93 |
| 2014/0282777 A1 | 9/2014 | Gonder et al. | |
| 2015/0201042 A1 | 7/2015 | Shah et al. | |
| 2015/0358662 A1* | 12/2015 | Drouin | H04N 21/2668 725/97 |

OTHER PUBLICATIONS

U.S. Appl. No. 14/670,945, filed Mar. 27, 2015, Phillips, et al.
Laabs, Matthias: "Adaptive multicast streaming". 2013 IEEE International Symposium on Broadband Multimedia Systems and Broadcasting (BMSB). Jun. 5, 2013.

* cited by examiner

US 9,621,933 B2

SYSTEM AND METHOD FOR PROVIDING VOD CONTENT IN A SWITCHED DIGITAL VIDEO NETWORK USING UNICAST ABR STREAMING

FIELD OF THE DISCLOSURE

The present disclosure generally relates to communication networks. More particularly, and not by way of any limitation, the present disclosure is directed to a system and method for providing Video-on-Demand (VOD) content in a switched digital video network using unicast adaptive bitrate (ABR) streaming.

BACKGROUND

Switched digital video (SDV) technology, also refereed to as switched digital broadcast or SDB, allows a cable TV system to decide which channels should be streaming at a given time without needing to allocate bandwidth for all channels streaming simultaneously. It provides some bandwidth dedicated to static or guaranteed channels (that will stream regardless of network state) and other bandwidth dedicated to switch channels (that can come up and go down in response to channel change requests/responses and network conditions). In providing content to consumers, traditional SDV architecture relies on a binary operation—either a bandwidth pipe can accommodate another channel or not. As a result, when the bandwidth pipe cannot fit another channel requested by user(s), they cannot watch the requested content, which is an unacceptable user experience.

Further, consumers are increasingly expecting flexible behavior from their video service, including on-demand offerings via SDV platforms, to enhance their viewing options. However, traditional cable environments supporting a single bitrate of content are largely unsuitable for providing a rich user experience.

SUMMARY

The present patent disclosure is broadly directed to systems, methods, apparatuses, devices, and associated non-transitory computer-readable media for facilitating delivery of guaranteed channels, non-guaranteed channels, and/or on-demand sessions in an SDV network using multicast ABR (MABR) and/or unicast ABR (UABR) streaming and suitable pipe modeling techniques. In one aspect, an embodiment of a method for providing guaranteed channels in an SDV network to a subscriber station comprises, inter alia, receiving a request from the subscriber station for a guaranteed channel and determining which edge quadrature amplitude modulator (QAM) device the requested guaranteed channel is assigned to. A bandwidth pipe associated with the edge QAM device is modeled/simulated for allocating appropriate bandwidth to an MABR stream of the requested guaranteed channel. Responsive to the bandwidth pipe modeling of the edge QAM device and determining that a particular MABR stream having an appropriate bitrate can be packed into the bandwidth pipe of the edge QAM device, the particular MABR stream of the requested channel is joined in order to facilitate its streaming via the edge QAM device. In one variation, the foregoing method may further comprise determining coder-decoder (codec) capabilities of the subscriber station and performing bandwidth pipe modeling with respect to selecting the particular MABR stream of the requested guaranteed channel responsive to the determination of codec capabilities of the subscriber station.

In another aspect, an embodiment of an apparatus for providing guaranteed channels in an SDV network to a subscriber station is disclosed. The claimed embodiment comprises, inter alia, a resource manager node that is responsive to a request received from the subscriber station for a guaranteed channel and configured to determine an edge QAM device to which the requested guaranteed channel is assigned. A QAM bandwidth modeling module of the resource manager node is operative to model a bandwidth pipe associated with the edge QAM device for allocating appropriate bandwidth to an MABR stream of the requested guaranteed channel. The apparatus or system also includes a stream processor node that is configured, responsive to the bandwidth pipe modeling by the resource manager node and determining that a particular MABR stream having an appropriate bitrate can be packed into the bandwidth pipe of the edge QAM device, to join the particular MABR stream of the requested channel so as to facilitate its streaming via the edge QAM device.

In yet another aspect, an embodiment of a stream processor node is disclosed that is operative to facilitate streaming of guaranteed channels in an SDV network to a subscriber station. The claimed stream processor node comprises, inter alia, one or more processors and a network interface configured for transmission of guaranteed channel content to an edge QAM device serving one or more subscriber stations via a Hybrid Fiber-Coaxial (HFC) network. A persistent memory module of the stream processor node includes program instructions that perform the following when executed by the one or more processors: responsive to a bandwidth pipe model received from a resource manager, wherein the bandwidth pipe model is determined for a select edge QAM device to which a requested guaranteed channel is assigned, allocating appropriate bandwidth in a bandwidth pipe associated with the select edge QAM device to fit a particular MABR stream of the requested guaranteed channel; interfacing with an Internet Group Management Protocol (IGMP) switch to facilitate joining of the particular MABR stream to a correct IGMP group, wherein the particular MABR stream is a gapped stream having a predetermined gap at stream access points (SAPs); and de-gapping the particular MABR stream to form an unsegmented stream for transmission to the edge QAM device.

In a further aspect, an embodiment of a method for providing non-guaranteed channels in an SDV network to a subscriber station is disclosed. The claimed embodiment comprises, inter alia, receiving a request from the subscriber station for a non-guaranteed channel and modeling a bandwidth pipe corresponding to each edge QAM device operative to support non-guaranteed channels by taking into account adding the requested non-guaranteed channel in order to determine which edge QAM devices can accommodate the requested non-guaranteed channel. A crowding metric is computed for all edge QAM devices capable of accommodating the requested non-guaranteed channel, whereupon a particular edge QAM with a lowest crowding metric value is selected. Bitrates of MABR streams of existing channels of the particular edge QAM device may be adjusted to accommodate a particular MABR stream having a select bitrate of the requested non-guaranteed channel. Thereafter, IGMP Join operations may be effectuated, if necessary, to join MABR streams of the existing channels and the requested non-guaranteed channel to correct IGMP groups in order to facilitate streaming of the channels via the particular edge QAM device. A channel change response message including one or more channel frequencies is then transmitted to the requesting subscriber station.

Relatedly, an embodiment of an apparatus for providing non-guaranteed channels in an SDV network to a subscriber station is disclosed. The claimed embodiment comprises, inter alia, a resource manager node that is operative responsive to a request received from the subscriber station for a non-guaranteed channel for performing modeling and simulation of a bandwidth pipe corresponding to each edge QAM device that can support non-guaranteed channels. The resource manager node is further operative to compute a crowding metric for all edge QAM devices capable of accommodating the requested non-guaranteed channel and to select a particular edge QAM device having a lowest crowding metric value. The claimed apparatus or system also includes a stream processor node that is operative responsive to the bandwidth pipe modeling of the particular edge QAM device provided by the resource manager node. Preferably, the stream processor node is configured to: adjust bitrates of MABR streams of existing channels of the particular edge QAM device to accommodate a particular MABR stream having a select bitrate of the requested non-guaranteed channel; and effectuate IGMP Join operations, if necessary, to join MABR streams of the existing channels and the requested non-guaranteed channel to correct IGMP groups in order to facilitate streaming of the channels via the particular edge QAM device. The stream processor node may further include program instructions configured for de-gapping the particular MABR stream of the requested non-guaranteed channel to form an unsegmented stream for transmission to the particular edge QAM device.

In a still further aspect, an embodiment of a method for providing VOD content in an SDV network to a subscriber station is disclosed. The claimed embodiment comprises, inter alia, receiving a notification from a VOD back office pursuant to a request received from the subscriber station to initiate a VOD session and obtaining codec capabilities of the subscriber station. Manifest information for the requested VOD session may be obtained based on quality of service and codec capabilities of the subscriber station. A bandwidth pipe modeling is performed for each edge QAM device operative to support VOD sessions by taking into account adding the requested VOD session in order to determine which edge QAM devices can accommodate the requested VOD session. A crowding metric for all edge QAM devices capable of accommodating the requested VOD session is computed, whereupon a particular edge QAM with a lowest crowding metric value is selected. Bitrates of unicast adaptive bitrate (UABR) streams of existing VOD sessions allocated to the particular edge QAM device may be adjusted to accommodate a particular UBAR stream having a select bitrate for the requested VOD session. Thereafter, UABR allocations of the bandwidth pipe of the particular edge QAM device may be effectuated for the existing VOD sessions and the requested VOD session. A response message including one or more VOD session frequencies is then transmitted to the requesting subscriber station.

In a related aspect, an embodiment of an apparatus for providing VOD content in an SDV network to a subscriber station is disclosed. The claimed embodiment comprises, inter alia, a resource manager node that is operative responsive to a notification from a VOD back office pursuant to a request received from the subscriber station to initiate a VOD session. Preferably, the resource manager node may be configured to perform the following: obtain a manifest for the requested VOD session based on quality of service and codec capabilities of the subscriber station; model a bandwidth pipe corresponding to each edge QAM device operative to support VOD session by taking into account adding the requested VOD session in order to determine which edge QAM devices can accommodate the requested VOD session; and compute a crowding metric for all edge QAM devices capable of accommodating the requested VOD session and select a particular edge QAM device having a lowest crowding metric value. A stream processor node provided with the apparatus is responsive to the bandwidth pipe modeling of the particular edge QAM device provided by the resource manager node. Preferably, the stream processor node may be configured to perform the following: adjust bitrates of UABR streams of existing VOD sessions of the particular edge QAM device to accommodate a particular UABR stream having a select bitrate for the requested VOD session; and effectuate UABR allocations of the bandwidth pipe of the particular QAM device for the existing VOD sessions and the requested VOD session in order to facilitate streaming of the sessions via the particular edge QAM device.

In the example embodiments set forth herein, channel change requests, requests for VOD sessions, and/or applicable response messages may be communicated via an HFC return channel signaling, or via a DOCSIS return channel signaling, or via a two-way communications network controller associated with the subscriber station. Further, in one or more additional embodiments, a resource manager node and a stream processor node may be integrated as an SDV server platform.

In still further aspects, one or more embodiments of a non-transitory computer-readable medium containing computer-executable program instructions or code portions stored thereon are disclosed for performing one or more embodiments of the methods set forth above when executed by a processor entity of a network node, resource manager node, stream processor node, gateway element, and the like. Additional features of the various embodiments are as claimed in the dependent claims.

Advantages of the present invention include, but not limited to, the ability to provide a higher quality of service across "always on" guaranteed channels to fit in the same QAM pipe by adjusting their bitrates. Embodiments set forth herein not only allow for provisioning a guaranteed bandwidth when needed, the requested guaranteed channels are allowed to increase in bitrate where appropriate and still allow policy management to weight/prioritize the streams differently. With respect to non-guaranteed channels, embodiments provide a more flexible experience to the subscribers because of the capability of multicast streams to fit into QAM pipes based on modeling so as to raise or lower in quality in accordance with network conditions. Such solutions prevent requests for the content that subscribers have paid for from being rejected outright because of poor conditions in the SDV network. Further, VOD-based embodiments of the present patent application provide a viewing experience that advatageously support varying levels of quality (by adjusting bitrates of UBAR streams). Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
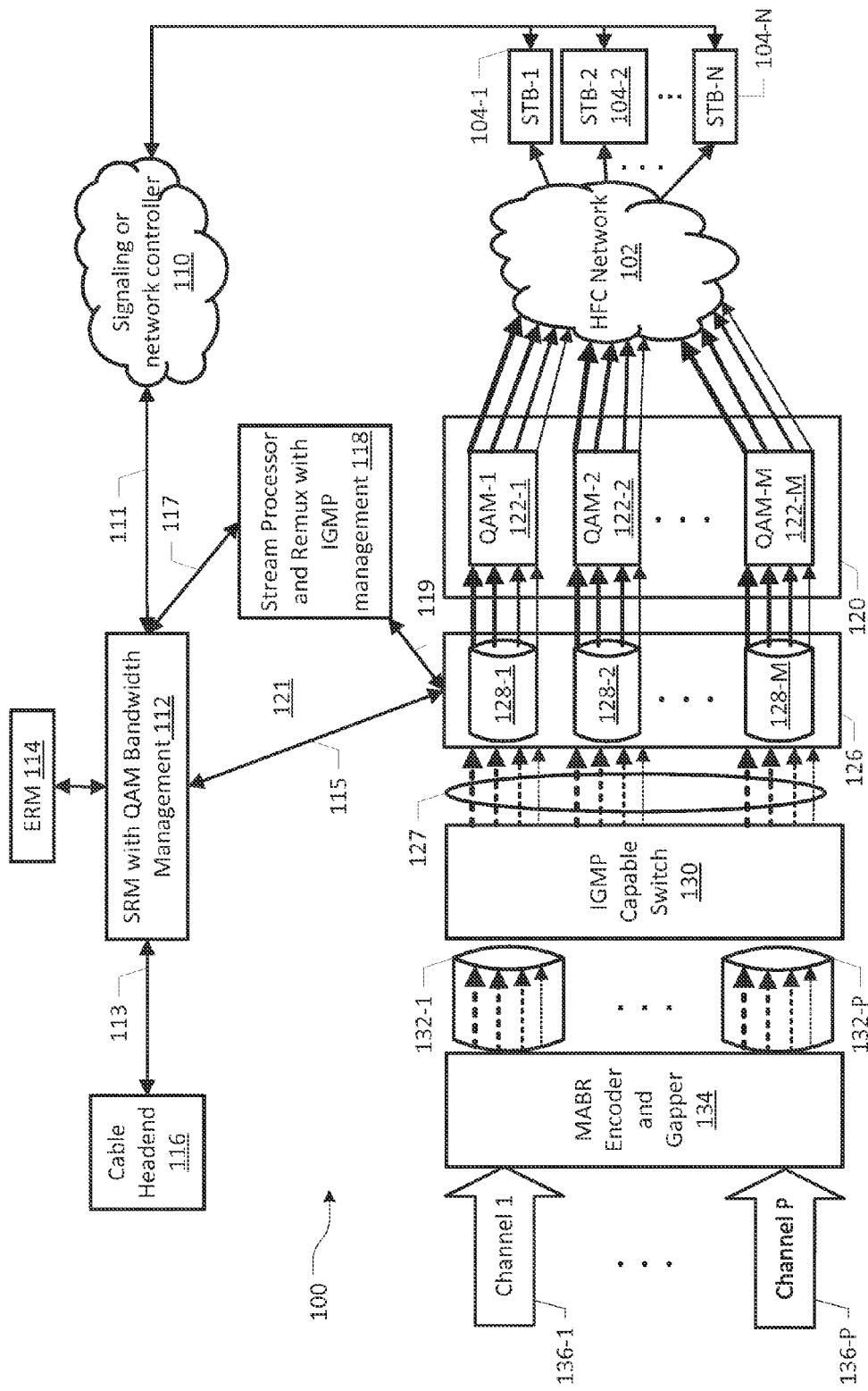
FIG. 1 depicts an example switched digital video (SDV) network wherein one or more embodiments of the present patent application may be practiced for providing guaranteed channels or non-guaranteed channels to a subscriber station using multicast ABR (MABR) streaming.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Accordingly, some network elements may comprise "multiple services network elements" that provide support for multiple network-based functions (e.g., NV media delivery policy management, session control, Quality of Service (QoS) policy enforcement, bandwidth scheduling management, subscriber/device policy and profile management, content provider priority policy management, streaming policy management, and the like), in addition to providing support for multiple application services (e.g., data and multimedia applications). Example subscriber end stations or client devices may comprise any device configured to execute, inter alia, a streaming client application (e.g., an ABR streaming client application) for receiving content from one or more content providers, e.g., via a broadband access network. Such client devices may therefore include set-top boxes (STBs) with or without integrated cable cards, TVs, personal/digital video recorders (PVR/DVRs), networked media projectors, portable laptops, netbooks, palm tops, tablets, smartphones, Voice Over Internet Protocol (VOIP) phones, mobile/wireless user equipment, portable media players, portable gaming systems or consoles (such as the Wii®, Play Station 3®, etc.) and the like that may access or consume content/services provided via a suitable switched digital video (SDV) network architecture for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example SDV network environment 100 wherein one or more embodiments of the present patent application may be practiced for servicing guaranteed channel (GC) requests or non-guaranteed channel (NGC) requests from subscribers using multicast ABR (MABR) streaming. By way of example and introduction, an SDV implementation is broadly set forth herein that is applicable to a Cable TV architecture without being necessarily limited thereto. As will be seen below, content may be delivered using either multicast ABR techniques or unicast ABR techniques. In a unicast delivery, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the link between the source server and a given receiver.

A unicast system can support ABR streaming, which allows some form of rate adaptation. A given service may be encoded at a selection of different bitrates (known as representations), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast delivery makes more efficient use of bandwidth by sharing content streams among several receivers. Intermediate network elements (e.g., routers or switches) are now more closely involved in the service delivery such that some control and management functions are delegated from the source server. This control is supported by more extensive protocols devised for this type of application such as Protocol Independent Multicast (PIM) and Internet Group Multicast Protocol (IGMP). When a new receiver requests a given media item, the network router system finds an existing stream of that content already in the network and directs a copy of it to that new receiver from a serving cable headend or an appropriately proximal network node in an edge distribution network. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download ABR clients of the premises that are designed to receive the video in bursts.

As pointed out above, the example SDV network environment 100 is architected for digital video distribution in a Hybrid Fiber-Coaxial (HFC) network infrastructure 102 configured to serve a plurality of subscriber homes or stations, collectively and/or generically shown as STB-1 104-1 to STB-N 104-N, wherein an STB may be respectively coupled to or otherwise integrated with at least one display device (not specifically shown). In general, STBs 104-1 to 104-N may be configured to operate with one or more coder-decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like. A headend node or facility 116 is operative to receive video content from various sources, e.g., pay TV broadcast programs via cable networks or satellite networks, free-to-air satellite TV shows, IPTV programs, time-shifted TV (TSTV) content, and the like, as a number of channels which may be frequency-multiplexed and modulated on to fiber-optic cables for transport out to a plurality of distribution hubs that may rejuvenate the signals for longer cable runs. A full block of modulated channels may be composited digitally and processed to produce suitable quadrature amplitude modulation (QAM) for each channel. One skilled in the art will recognize that a distribution hub (also sometimes referred to as an edge node hub) may include various entities including but not limited to one or more edge routers/switches, an array 120 of radio frequency transmitter edge devices such as edge QAM modulators 122-1 to 122-M as well as additional entities that will be described in detail hereinbelow. The number of edge QAM devices 122-1 to 122-M in each hub may vary depending on implementation, e.g., total number of channels, number of subscribers, size of a service area, etc. As used herein, the term "QAM" refers to, without limitation, modulation schemes used for sending signals over cable access networks. Such modulation schemes may use any constellation level (e.g., QAM-16, QAM-64, QAM-256 etc.) depending on the details of a cable access network. A QAM may also refer to a physical channel modulated according to such schemes. Further, QAM may refer to a single QAM device that can output a multiplex of program channels, e.g., ten or twelve programs, although the actual number may be dictated by a number of factors, including the communication standard that is employed. In the example SDV network implementation of FIG. 1, the edge QAM devices 122-1 to 122-M may generally be adapted to: (i) receive Ethernet frames that encapsulate the transport packets, (ii) de-capsulate these frames and remove network jitter, and (iii) transmit radio frequency signals representative of the transport stream packets to end user devices, e.g., STB-1 104-1 to STB-N 104-N, over the HFC network 102. Typically, each transport stream is mapped to a downstream QAM channel according to a channel plan designed by the cable network operator, wherein each QAM channel is configured with a carrier frequency that differs from the carrier frequency of the other channels.

Depending on an embodiment of the present invention, edge QAM devices may be configured in a number of ways. For instance, where there is no QAM sharing, each type of service may be supported by a different QAM device, i.e., broadcast channels being mapped to a group of dedicated QAMs, VOD channels being mapped to another group of dedicated QAMs and the SDV channels being mapped to yet another group of dedicated QAMs. In another implementation where inter-QAM sharing is provided, a single edge QAM device may support broadcast, VOD and SDV services (i.e., shared QAM device implementation). In a still further variation that allows intra-QAM sharing, both VOD and SDV services may be supported on the same QAM channel. It should be apparent that the QAM array or bank 120 may therefore be implemented to include a variety of QAM combinations based on whether static channels (i.e., guaranteed channels with a minimum QoS on fixed frequencies), switched channels (i.e., non-guaranteed channels), or VOD/NPVR content channels are being provided pursuant to subscriber requests in accordance with the embodiments of the present disclosure, wherein all edge QAM devices in a single edge node or distribution hub may belong to a single service group.

A Session Resource Manager (SRM) with QAM bandwidth management 122, an Edge Resource Manager (ERM) 114 as well as a stream processor and remux node 118 are provided to effectuate delivery of guaranteed channels and/or non-guaranteed channels using MABR bandwidth management and channel packing techniques set forth below. In one implementation, SRM and ERM nodes 112, 114 may be integrated as a single/co-located entity disposed at a distribution hub. In another implementation, SRM 112 may reside at the headend 116 and configured to communicate with an SDV application server or ERM operative to subscriber channel requests which may be provided or received from STBs via a quadrature phase shift keying (QPSK) or via a return channel network in a Data Over Cable Service Interface Specification (DOCSIS)-compliant Cable Modem Termination System (CMTS). It should be appreciated that in an implementation of the present invention involving legacy STB devices, two example methods to receive downstream out-of-band (OOB) signals can be a QPSK system or a DAVIC arrangement based on SCTE 55-1 and SCTE 55-2, wherein the OOB signals may be used for one-way and/or two-way communications with the STBs. Where a separate DOCSIS return path is not provided, control signaling for two-way communication may be effectuated using a suitable network controller and/or cable card architecture. In one implementation of two-way communications between subscriber stations and SDV infrastructure, suitable protocols, specifications and architectures such as Channel Change Protocol (CCP), Session Setup Protocol (SSP), SDV Channel Change Message (CCM) Interface Specification, Cable-CARD specification, OpenCable Application Platform (OCAP), and the like. Collectively, these options are exemplified by signaling network 110 in the SDV network environment 100 of FIG. 1.

A communication pipe 126 operative to support appropriate total bandwidth for the entire QAM bank 120 is illustratively provided between the QAM devices and an Internet Group Multicast Protocol (IGMP) switch 130 (e.g., IGMPv3-capable Gigabit Ethernet (GigE) multicast router), wherein each QAM device is allowed a virtual pipe of certain bandwidth depending on how many channels it supports (e.g., from 8 up to 128 channels). Reference numerals 128-1 to 128-M refer to M such virtual pipes, which one implementation may comprise 33.8 Mbs each, that correspond to QAM devices 122-1 to 122-M. For QAMs handling guaranteed channels, the corresponding virtual pipes may be designated as virtual guaranteed pipes. Likewise, virtual pipes associated with QAMs that support switched channels may be referred to as virtual SDV switched pipes and virtual pipes associated with QAMs that support VOD/NPVR content channels may be referred to as virtual VOD pipes.

In one implementation where various content service channels 136-1 to 136-P may be sourced as unsegmented continuous streams, a multicast stream formation (MFS) functionality may be provided for facilitating multicasting of media as MABR channels having segmented streams at different bitrate representations, which may be suitably bandwidth-managed for delivery via a QAM bandwidth pipe. In one example implementation, the MFS functionality may be provided at the edge network node or the distribution hub. In other implementations, the MFS functionality may be provided at some other upstream node (e.g., headend 116)

although it should be understood that such an upstream implementation is generally wasteful because multiple versions of the content channels need to be transported across the network to different distribution hubs or edge nodes. Regardless of where such MFS functionality is implemented, attention is now directed to FIG. 18 that depicts a block diagram of an apparatus 1800 operative as a multicast ABR encoder and gapper for segmenting content channels in order to facilitate SDV-based delivery according to an embodiment of the present patent application. Apparatus 1800 is advantageously configured for creating a set of segmented stream representations and forming bursts with respect to a media service, which segmented streams may be provided with suitable inter-segment gaps that allow channel operations such as channel joining, channel leaving, switching, splicing in or splicing out, channel (re)multiplexing, de-gapping, etc. as part of downstream operations (e.g., at IGMP switch 130 and stream processor and remux node 118), whereby service representations having appropriate bitrates (i.e., channels) may be accommodated within specific virtual QAM pipes based on bandwidth management and modeling techniques. In an example implementation, apparatus 1800 may receive an input feed 1802 of content (e.g., NV media or content) per service at an input block 1806 that fans the feed to a plurality of encoders/transcoders 1808-1 to 1808-N, which generate, in parallel, a set of representations of the content at different bitrates. The representations can differ in video resolution depending on the bitrate of encoding. A timing generator 1804 outputs a signal that determines the boundary point of the segments. For example, this functionality may output a signal once per 50 frames (2 seconds), or at any other suitable time interval. The signal output by generator 1804 is applied to all of the parallel encoders 1808-1 to 1808-N for that service. Advantageously, the set of coders 1808-1 to 1808-N can close a Group of Pictures (GOP) and a boundary point insertion unit 1812 can insert in-band signaling such as a Random Access Point (RAP) and a Boundary Point (BP). The outputs of the set of coders 1808-1 to 1808-N are the set of representations 1810 which have time-aligned segments. The representations 1810 are applied to a burst generator unit 1818 that creates the bursts separated by window periods (e.g., on the order of tens or hundreds of milliseconds). In operation, unit 1818 may be configured to play out data at a higher bit rate than the bit rate at which data was received to create the bursts and is operative to recognize the start and end of segments in the representations 1810 by detecting suitable signaling markers (e.g. the in-band BP signaling inserted by the encoders).

Multicast address information may be added at an IP adaptation stage, which can occur at an edge network node such as the stream processor and remux node 118 or at a node further downstream. Multicast IP datagrams have a destination IP address that is set to be in a range reserved for multicast. It should be appreciated that the apparatus shown in FIG. 18 can operate on data at one of various possible levels. In one advantageous scheme, data may be encoded into Transport Stream (TS) packets at a normal rate and the burst generator unit 1818 operates on TS packets. Transport Stream packets can be adapted into IP packets before burst generator unit 1818 at adaptation block 1816, or after unit 1818 at adaptation block 1822. Another alternative is to form bursts before any packetization (at TS or IP level), but this may be less desirable.

Figure 18:
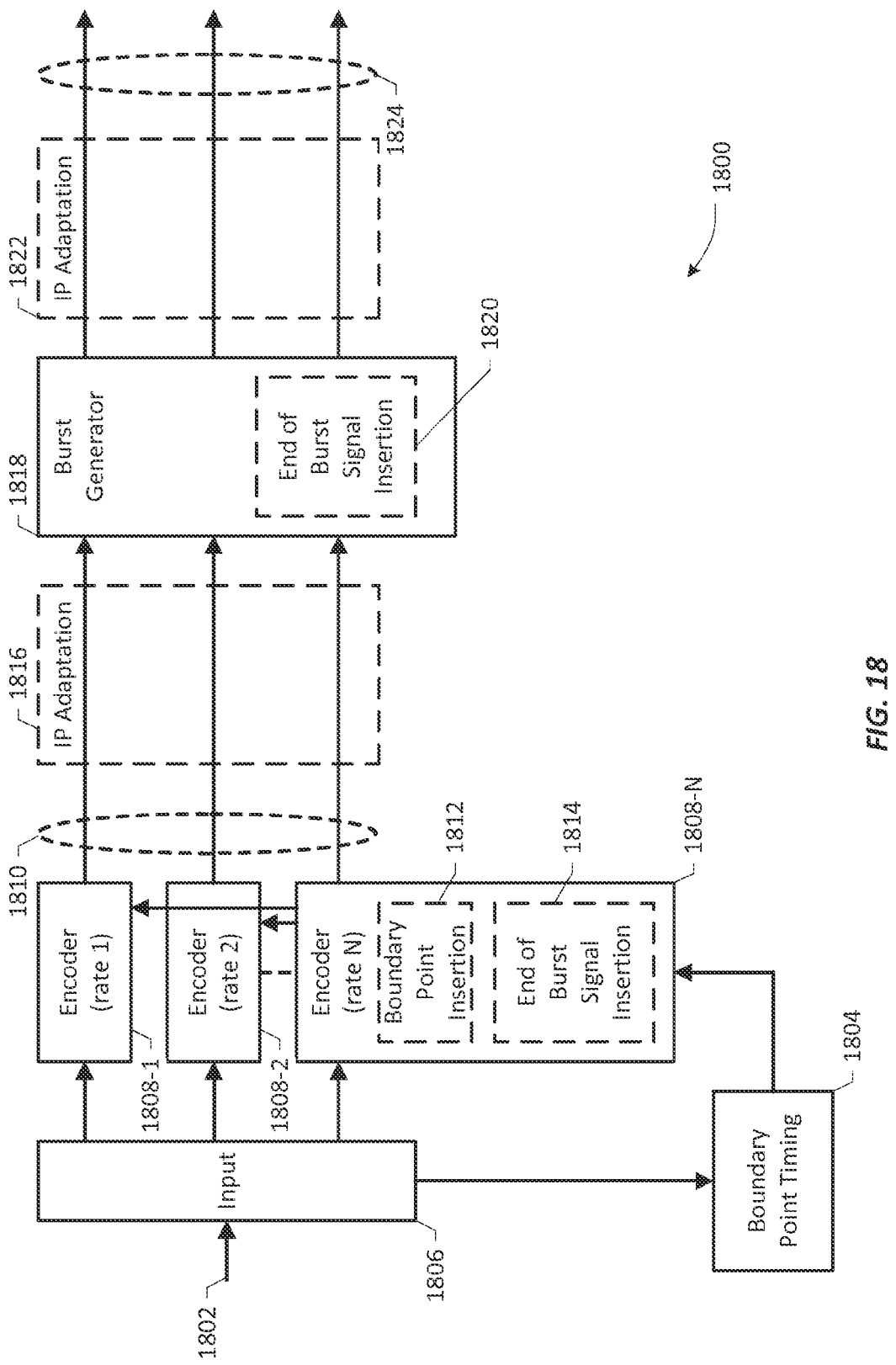
FIG. 18 depicts a block diagram of an apparatus for segmenting media/content channels according to an embodiment of the present patent application.

FIG. 18 further illustrates several possible places where end of burst signaling can be added. Each encoder 1808-1 to 1808-N can include an end of burst signal insertion unit 1814 that adds an information element indicating the end of a burst into the encoded data, which includes a header of the TS packets. Alternatively, the burst generator unit 1818 can include an end of burst signal insertion unit 1820 arranged to insert an information element indicating the end of a burst into each of the bursts. Where end of burst signaling is provided as a multicast (with same or different address), the multicast can be generated at the edge network node.

Typically, a network operator may receive a media content service feed from a service provider, which may then be converted to streams or channels having the right characteristics for the edge distribution network and end users of the network. Although FIG. 18 shows a set of encoders/transcoders 1808-1 to 1808-N configured to operate upon an input data stream 1808 to form the multiple representations at different bitrates, such a stage may be bypassed where a set of representations at different bitrates already exist. Accordingly, it should be understood that multiple representations for a media content stream can be generated at a point of origin into the edge distribution network or could be supplied by a service provider, wherein the multiple representations can include various definitions, e.g., Standard Definition (SD), High Definition (HD), Ultra HD, etc., of the same content. A skilled artisan will recognize that the duration of the window period (e.g., 200 to 300 milliseconds or thereabouts) introduced in a segmented stream is of sufficient magnitude for a multicast receiver to leave one representation of the stream and join a different representation at a different bit rate or an entirely different media stream, at appropriate stream access points (SAPs), which may be accomplished by issuing appropriate IGMP Leave and Join messages.

A potential consequence of adding window periods or gaps to the transmitted streams is that the flow of content may become jittered beyond the level that normal packet transmission produces. This can be accommodated by buffering provided within an intermediary reception apparatus, e.g., stream processor and remux node 118. The window period duration will influence the amount of jitter produced and so there is an optimum size that is related to the worst-case response times of the chain of routers/servers delivering the content. This time is taken for switches to recognize and implement all those steps that are required to keep the stream flowing including the potential need for the multicast content to be found at or near the source server. For segment durations of the order of about 2 seconds, a possible value of the window period is around 330 milliseconds. The window size is a function of the responsiveness of the network to support multicast Leave and Join functions and it will be appreciated that the window period can be modified to a higher or lower value. More generally, the window period could have a value selected from the range of 0.1 ms and 10 seconds and, more advantageously, the range 10 ms-350 ms. As switches and routers increase in performance, it is possible that the window duration can be reduced to the lower end of the ranges stated above. In one implementation of the stream processor and remux functionality, a 300 ms gap and 2-segment buffer allows the stream processor node 118 to perform IGMP Leave and Join operations for seamless bitrate/channel change to the subscriber stations. Additional details regarding multicast segmented stream formation and channel joining/leaving techniques may be found in commonly owned PCT Application No. PCT/EP2012/070960, titled "A METHOD AND APPARATUS FOR DISTRIBUTING A MEDIA CONTENT SER- VICE", filed Oct. 23, 2012, in the name(s) of Anthony Richard Jones, now published as WO2014/063726, incorporated by reference herein.

When a channel is selected that is not in use, an IGMP Join operation may be performed to pass the stream having a suitable bitrate to the proper edge QAM device according to the techniques described below. Likewise, if a channel is already active, the stream may be routed to the necessary QAM channel of the subscriber based on managing the virtual pipe bandwidth associated therewith. Returning to FIG. 1, one or more MABR encoders/gappers 134, each of which may be implemented as apparatus 1800, may receive a group of service channels wherein encoders feed into a "gapper" functionality as set forth above (needed for multicast adaptive bitrate files to change on the fly). These gapped streams are provided to IGMP switch 130 via respective pipes 132-1 to 132-P, whereupon a subset of the gapped streams 127 may be joined under IGMP management control provided by the stream processor and remux node 118. Further, a de-gapping/remux module of the stream processor node 118 is operative to de-gap and feed the joined streams into respective QAM virtual pipes pursuant to various queuing algorithms for transmission to edge QAMs 122-1 to 122-M. Should bitrates need to be modified, the gaps serve as a pause to allow video changeover (while not impacting end user quality of service). The decision to modify the bandwidth is handled by the QAM bandwidth management functionality of the stream processor node under control of bandwidth/pipe simulation and modeling, etc. by the related nodes, (i.e., SRM 112 and ERM 114).

With respect to the delivery of guaranteed channels (i.e., "always on" static channels with guaranteed minimum QoS and guaranteed availability on specific assigned frequencies known to STBs), broadly, an embodiment of the present invention utilizes the foregoing SDV network architecture 100 wherein a system is created for performing, inter alia, a determination as to which guaranteed channels are being requested by the subscriber stations. Available bandwidth may be divided between requested/active channels according to various policies. Non-requested guaranteed channels can remain at a default bitrate, be deactivated or otherwise reduced in bitrate, depending on implementation. Since the channels are guaranteed, there will always be available bandwidth for a given bitrate determined by minimum guaranteed video QoS for these channels regardless of the network state. The calculated optimal bitrate may be chosen from pre-encoded adaptive bitrate files or streams based on various policy rules and algorithms. The selected bitrate file or stream is then sent across the pipe.

An example system may therefore involve interactions among various entities of the SDV architecture 100 via suitable interfaces. A signaling interface 111 with SRM/ERM functionality is operative for receiving channel change requests from one or more subscriber stations. Interface 113 is operative for providing channel map information as well as STB properties and MAC address information from the headend 116 to the SRM/ERM node. Interfaces 115, 117 and 119 are operative for facilitating interactions relative to HFC QAM virtual pipe modeling, providing a pipe model and supplying a list of multicast addresses per broadcast channel per QAM, applying the pipe allocations based on the modeled pipe, and the like. It should be appreciated that pipe modeling may be performed by a suitable bandwidth modeling and management module operating at SRM/ERM 112/114, which provides the pipe modeling results to the stream processor and remux node 118 having IGMP management functionality. Appropriate service logic executing at the stream processor node 118 is operative to de-gap the channels and provide control signals to IGMP switch 130 for coupling the de-gapped channels to corresponding QAMs based on exercising suitable IGMP operations. The foregoing Interactions among the SRM/ERM and stream processor nodes may also be implemented in an integrated or coupled fashion wherein the entities may form an apparatus or system 121 for facilitating delivery of guaranteed channels and non-guaranteed channels in the example SDV network 100.

Figure 2:
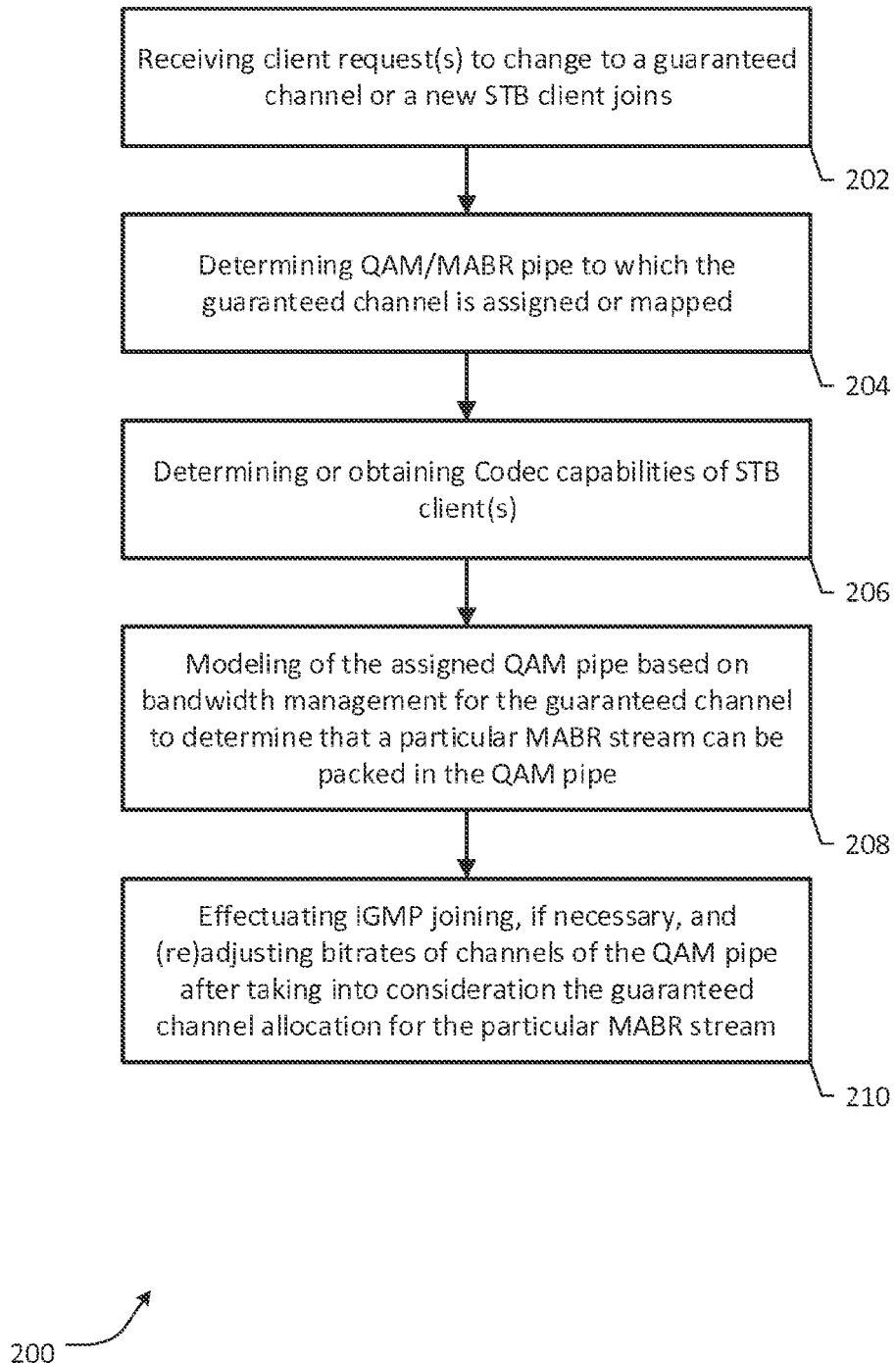
FIG. 2 is a flowchart of various blocks, steps, acts and/or functions that may take place at a network node for providing a guaranteed channel to a subscriber station in an implementation of the SDV network of FIG. 1.

FIG. 2 is a flowchart of a scheme 200 comprising various blocks, steps, acts and/or functions that may take place at a network node, apparatus or system for facilitating delivery of a requested guaranteed channel to a subscriber station in an implementation of the SDV network of FIG. 1. At block 202, client request(s) to change to a guaranteed channel or control signal(s) responsive to one or more new STB clients coming on-line with a particular guaranteed channel are received by the network node, e.g., SRM/ERM. A determination is made to identify the QAM/MABR pipe to which the guaranteed channel is assigned or mapped (block 204). Because client stations may use different codecs (e.g., MPEG-2, MPEG-4, H.265, H.264, etc.), an example implementation may optionally include a determination process for ascertaining and/or obtaining the codec capabilities of STB client(s) (block 206). The assigned QAM pipe may be modeled based on bandwidth management for the guaranteed channel, i.e., for allocating appropriate bandwidth to a multicast ABR stream of the requested guaranteed channel, to determine that a particular MABR stream having an appropriate bitrate (which can be a default rate or a rate higher than the default rate) can be packed into the bandwidth pipe of the assigned edge QAM device (block 208). One skilled in the art should appreciate that since there can be a one-to-one correspondence between a MABR virtual pipe and associated edge QAM device, the terms "MABR virtual pipe", "virtual guaranteed pipe", and "QAM pipe" may be used roughly synonymously in some embodiments of the present invention. Responsive to the bandwidth pipe modeling of the edge QAM device and after determining that a particular MABR stream having an appropriate bitrate can be packed into the bandwidth pipe of the edge QAM device, IGMP joining of the particular MABR stream of the requested channel is effectuated, if necessary, as well as (re)adjusting the bitrates of the channels, to facilitate its streaming via the edge QAM device to the requested subscriber station, as set forth at block 210.

Figure 3:
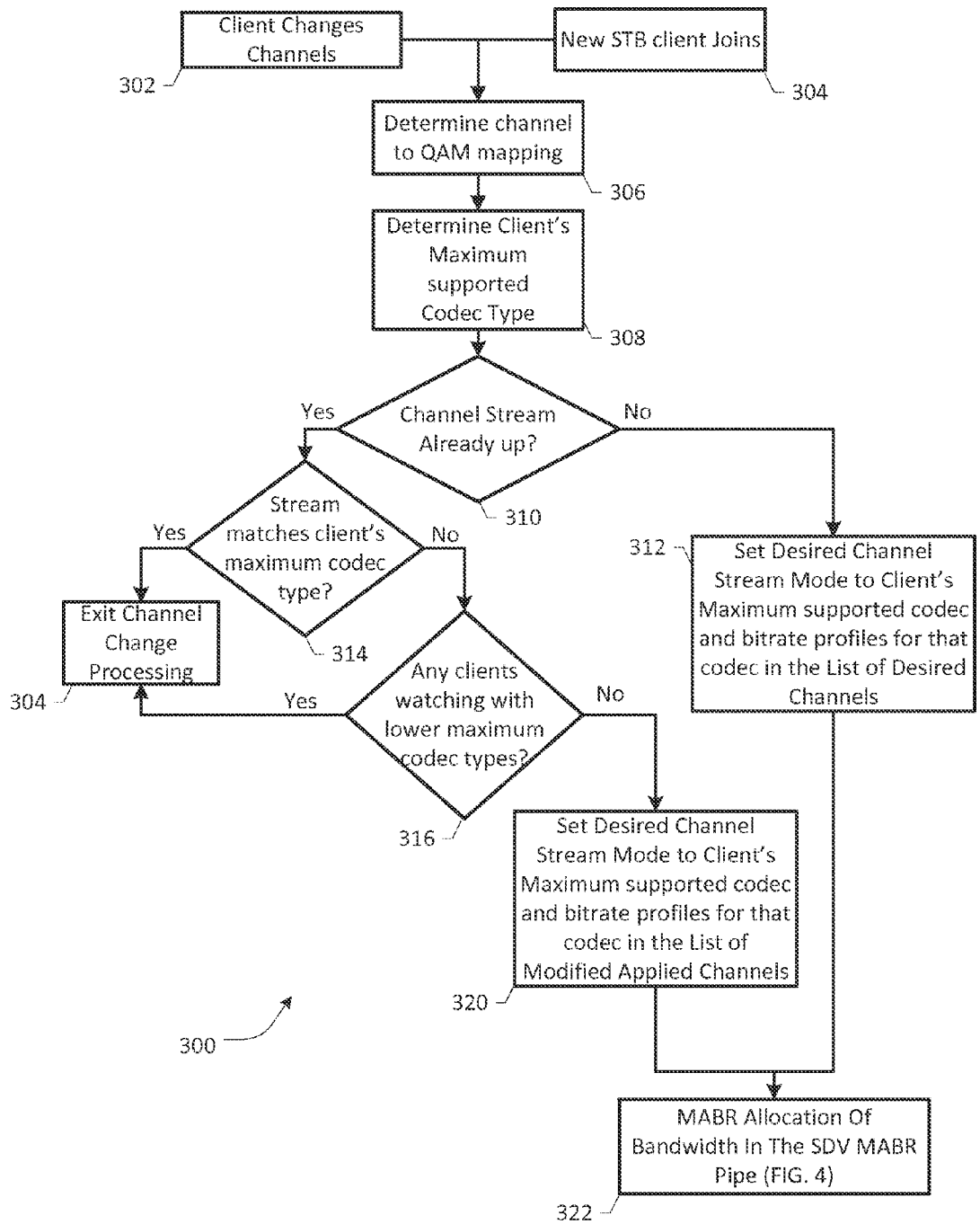
FIG. 3 is a flowchart of an example codec arbitration process that may be engaged for facilitating delivery of guaranteed channels or non-guaranteed channels to a subscriber station in an implementation of the SDV network of FIG. 1.

As different subscriber stations may use codecs of varying standards (and the same content may be provided in multiple versions compatible with different codecs), a codec arbitration process may be effectuated to optimize bandwidth allocation and QAM pipe modeling for additional bandwidth savings. For example, if a particular codec is the most efficient one and if all clients can support it, that version of the content stream may be selected (e.g., selecting H.264 over MPEG-2). On the other hand, if some clients request MPEG-2, then that codec may have to be selected regardless of potential bandwidth savings, since H.264 codecs can decode MPEG also but not vice versa. FIG. 3 is a flowchart of an example codec arbitration process 300 that may be engaged for facilitating delivery of guaranteed channels or non-guaranteed channels to a subscriber station in an implementation of the SDV network 100 of FIG. 1. One skilled in the art will recognize that the example codec arbitration process 300 is a particular implementation of block 206. Either block 302 (clients changing channels) or block 304 (a new STB client joins by turning on), which roughly relate to the acts set forth at block 202, may generate a guaranteed channel request that initiates codec arbitration. At blocks 306 and 308, the QAM to which the requested guaranteed channel is mapped and the requesting client's capabilities (e.g., maximum supported codec type, etc.) are determined. If the requested channel stream is already active (decision block 310), a further determination is made as to whether the stream matches the client station's maximum codec capability (decision block 314). If so, codec arbitration and channel change processing is exited (block 304) and the requesting client's QAM is tuned to the assigned frequency, as there is no reallocation is needed. In similar fashion, if the stream does not match the client station's maximum codec capability and if there are clients watching the same requested channel with lower maximum codec types (block 316), codec arbitration and channel change processing terminates also (block 304).

If the requested channel stream is not already up (decision block 310), a number of activities may take place in order to facilitate MABR pipe modeling of the particular QAM pipe to which the requested channel is assigned. As illustrated at block 312, a desired channel stream mode is set to the client's maximum supported codec and bitrate profiles for that codec are added in a list of desired channels. Likewise, if there are no clients watching the same requested channel with lower maximum codec types (block 316), a desired channel stream mode is set to the client's maximum supported codec and bitrate profiles for that codec are added in a list of modified applied channels (block 320). Broadly, the goal of either block 312 or 320 is to build a listing of codecs supported by the STBs and determining, for each codec type, different bitrate streams of the requested channel for modeling purposes, as set forth at block 322.

Figure 4:
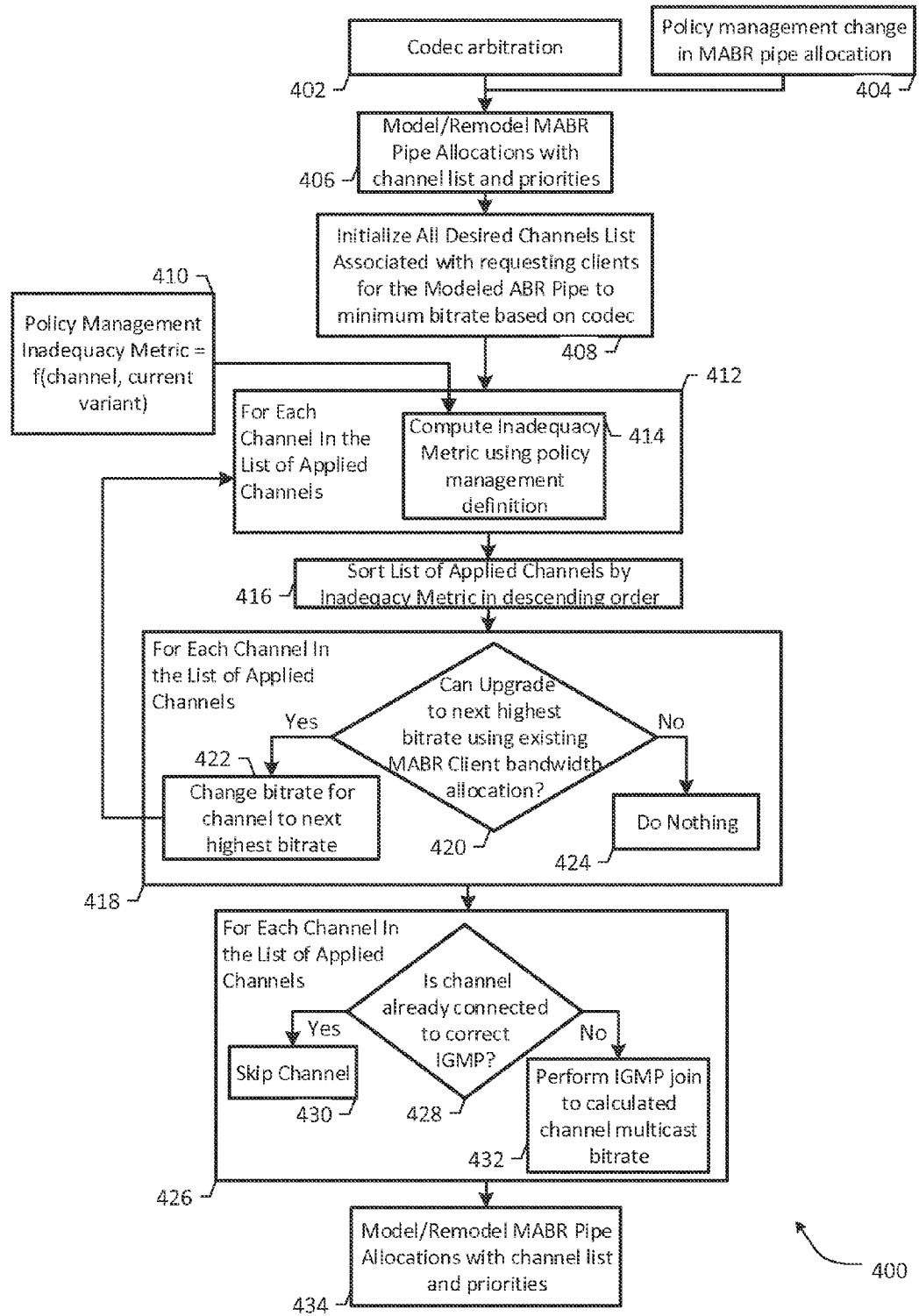
FIG. 4 is a flowchart of an example channel allocation process using MABR that may be engaged as part of the process of FIG. 2 for providing a guaranteed channel according to an embodiment of the present patent application.

Turning to FIG. 4, depicted therein is a flowchart of an example channel allocation process 300 using MABR pipe modeling that may be executed as a particular implementation of block 322 shown in FIG. 3. As pointed out previously, guaranteed channels are statically assigned to edge QAMs. Example pipe modeling scheme is operative to choose or converge to a model in which bandwidth of the assigned QAM pipe may be redistributed optimally among the various guaranteed channels sharing the assigned QAM pipe after taking into account the effect of the requested channel. Accordingly, an already existing guaranteed channel of the QAM pipe may experience lowering of its bandwidth, e.g., all the way down to its default value or to some other intermediate value in order to fit the new channel. Additionally or alternatively, bandwidth of the channels that are not being watched may be repurposed in order to improve the quality of the other channels of the QAM pipe. In general, the new channel is added to the QAM pipe based on what is referred to herein as "inadequacy metric" that is used for selecting which streams are eligible for a bandwidth upgrade during annealing (i.e., iteratively changing bandwidth until no further optimal reallocation can be made). Basically, the inadequacy metric (IM) may be considered as a measure of how far out of balance an allocation to a stream is with regard to its priority and the priority of the other streams. Several examples of determining the inadequacy metric are listed below, although other measures of an imbalance can be used in practicing the disclosed embodiments. In one example methodology, given a list of channels and the ABR bandwidths available for each channel, the channels are first sorted by their priority (or other parameters relating to channel weight). A select minimum bandwidth version of the channel is added to the pipe plan. If the channel's minimum bandwidth does not fit (i.e., the pipe is overbooked), then it does not go in the pipe plan and the process moves on to the next channel for further iterations to see how much of an upgrade can be made to the pipe plan. As the channels in the list are sorted by the inadequacy metric, the process can start with the most inadequate channel allocation for attempting to upgrade the bandwidth to the next highest available version of a channel. As pointed above, if the upgrade does not fit within the pipe, that upgrade is skipped and the scheme proceeds to the next most inadequate channel. One skilled in the art should realize that a further variation in optimization may be where channels whose upgrade is impossible, they can be removed from consideration for the rest of the annealing loop. Once a channel is selected for upgrade, the inadequacy metric is recomputed and the scheme restarts the annealing loop, which may be configured to end when no channels can be upgraded to fit into the bandwidth allocation of the QAM virtual pipe.

Several different inadequacy metrics can be implemented in practicing the foregoing scheme. In one example, the metric may be defined as a ratio of channel priority or weight to the bitrate, which guides the channel allocation toward a situation where each channel has a share of the bandwidth of the pipe proportional to its weight or priority. Another formulation could be a ratio of channel weight to its "quality", which can be quantized in some fashion (e.g., some function of the bitrate). A more complicated version might take into account the amount of action in a scene of the content, allowing bitrates to vary according to content. For instance, an action scene might get more of the pipe until the stream reaches a calmer moment in the content, at which point it returns bandwidth to the other streams in the pipe. In a still further variation, the IM may be defined as a function:

$$IM = 1/rate \| weight$$

where $\|$ means a relative comparison of entities having different components. For example, when comparing two metrics such as a1$\|$b1 and a2$\|$b2, we compare the first parts first. If the first parts are unequal, we use the first parts to determine the comparison. If the first parts are equal, then we compare the next part to determine the comparison. So, by way of illustration, 1$\|$100<2$\|$1, but 1$\|$100>1$\|$5. Given that definition, it can be seen that the 1/rate$\|$priority metric may result in all streams being allocated similar bandwidth. Regardless of how the IM is defined, each iteration of the annealing loop may be configured to upgrade the channel with the least bandwidth, and when there are multiple channels at the least bandwidth, it will upgrade the highest priority one first. The following is an example of the annealing process loop with the following weights, bitrates per channel and IM values for a single QAM pipe.

TABLE I

| Simulated: Channel | Weight | Encoded Bitrates |
|---|---|---|
| Existing ABC | 4 | 1.0, 1.2, 1.4, 1.7, 2, 2.4, 2.7, 3, 4, 6, 8, 10, 12, 15 |
| Existing CBS | 4 | 1.0, 1.2, 1.4, 1.7, 2, 2.4, 2.7, 3, 4, 6, 8, 10, 12, 15 |
| Existing TOON | 3 | 1.0, 1.2, 1.4, 1.7, 2, 2.4, 2.7, 3, 4, 6, 8, 10, 12, 15 |

TABLE I-continued

| | | |
|---|---|---|
| Existing HBO | 7 | 2, 2.4, 2.7, 3, 4, 6, 8, 10, 12, 15 |
| New SHO | 7 | 2, 2.4, 2.7, 3, 4, 6, 8, 10, 12, 15 | pipe size = 38
metrics: weight/rate
log:
add HBO @2
add SHO @2
add ABC @1
add CBS @1
add TOON @1

| channel | ABC | CBS | TOON | HBO | SHO |
|---|---|---|---|---|---|
| rate | 1 | 1 | 1 | 2 | 2 |
| inadequacy | 4 | 4 | 3 | 3.5 | 3.5 | upgrade ABC to 1.2
upgrade CVS to 1.2
upgrade TOON to 1.2

| channel | ABC | CBS | TOON | HBO | SHO |
|---|---|---|---|---|---|
| rate | 1.2 | 1.2 | 1.2 | 2 | 2 |
| inadequacy | 3.333 | 3.333 | 2.5 | 3.5 | 3.5 | upgrade HBO to 2.4
upgrade SHO to 2.4
upgrade ABC to 1.4
upgrade CVS to 1.4
...
Ending Log:
ABC @6, CBS @6, TOON @6, HBO@10, and SHO@10

An upgraded log would include a list of channels sorted by inadequacy and indicate which one was chosen and which were passed over (because they wouldn't fit), and this log would appear for each step of the annealing loop (not just the two shown in the Table above).

Continuing to refer to FIG. 4, the foregoing bandwidth annealing scheme is advantageously employed in the example QAM pipe bandwidth allocation process 400 for accommodating guaranteed channel request(s) from one or more subscriber stations. As set forth at blocks 402 and 404, aside from the codec arbitration process of FIG. 3, a policy management change in the MABR/QAM pipe allocation may also initiate the allocation process. At block 406, pipe allocations of the assigned QAM is modeled (or remodeled, if starting from the results of a prior allocation model) based on the channel list and associated priorities. At block 408, a list of all desired channels associated with the requesting client(s) (which can be traditional STBs, ABR-capable STBs, or other content consuming devices) for the modeled ABR pipe may be initialized to a minimum bitrate based on codec capabilities. For each channel in the list of applied channels, an IM computation loop 412 may be executed based on a policy management definition of the IM parameter whereby an IM value may be obtained, as set forth at blocks 410 and 414.

Once the IM values have been computed for the list of channels of the pipe, the list is sorted by the IM values in descending order (block 416), so that the channel stream that is most out of balance is considered first. Then, for each channel of the sorted list, in descending order, an annealing loop 418 may be executed as described above. A decision block 420 may involve a determination as to whether the channel can be upgraded to the next highest bitrate using the existing MABR bandwidth allocation. If the channel cannot be upgraded to the next highest bitrate stream, no further processing is performed for that channel (block 424). However, if the channel can be upgraded to the next highest bitrate, the bitrate for the channel is changed to the next highest bitrate (block 422) and the method returns to the annealing process 412. In practice, if only one stream has a changed bitrate, it is necessary only to recalculate the inadequacy metric for the channel that has just been bumped to a new bitrate and to again sort the list of applied channels. This return to the annealing process is necessary because the channel that has just received a bump in bitrate may still be the furthest out of balance, e.g., if the channel receiving the bump is associated with a priority value of 1 while the other channels are at priority 3. After the annealing loop 418 has been completed, the process 400 enters an IGMP verification loop 426 in order to ensure that each channel stream of the list of applied channels is joined to correct IGMP. If the channel is already connected to the correct IGMP multicast (block 428), there is no need to change the connection and the channel stream is skipped (block 430). If the MABR channel is not already connected to the correct IGMP multicast, an IGMP Join is performed to join the calculated multicast bitrate channel stream (block 432). After all channels of the QAM pipe are correctly connected, the allocation process 400 applies the pipe model to the QAM pipe disposed between the IGMP-capable switch and the particular QAM and returns to the state ready for next (re)modeling (block 434). It should be appreciated that while guaranteed channels will not necessarily always be on in the MABR arrangement described above, they will always have a guaranteed bandwidth when needed (e.g., as requested by a client).

Figure 5:
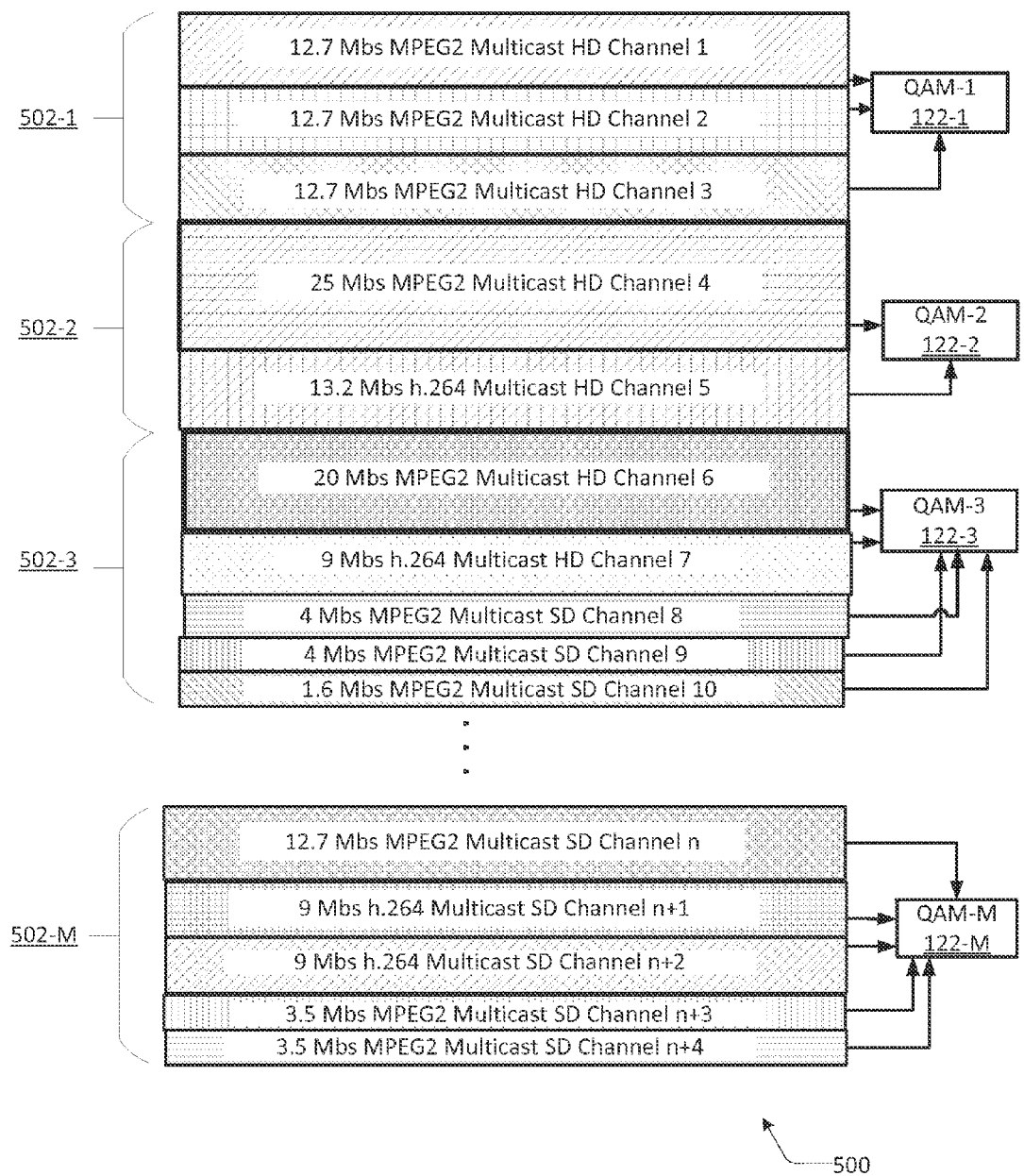
FIG. 5 depicts an example QAM pipe bandwidth allocation for accommodating a guaranteed channel request.

FIG. 5 depicts an example QAM pipe bandwidth allocation 500 with respect to QAM bank 122-1 to 122-M after accounting for accommodating a guaranteed channel request. It should be appreciated that the total QAM bank pipe is comprised of individual virtual pipes 502-1 to 502-M, each pipe being dynamically allocated wherein non-equal bandwidth may be distributed among various channel streams. Example codecs MPEG-2 and H.264 may support bitrates for both HD and SD channels at various levels of bitrate granularity. Illustratively, MPEG-2 bitrates per service may comprise: 30 Mbs, 25 Mbs, 20 MBs, 15 Mbs and 12.7 Mbs for HD service and 4 Mbs, 3 Mbs, 2.5 Mbs and 2.0 Mbs for SD service. Likewise, H.264 bitrates per service may comprise: 17 Mbs, 15 Mbs, 13.2 MBs, 9 Mbs and 6 Mbs for HD service and 2 Mbs, 1.6 Mbs, 1.3 Mbs, 800 Kbs and 500 Kbs for SD service. Each QAM pipe is packed with channels that are mapped thereto wherein the channel streams are such that the total bandwidth of that pipe may not exceed the maximum assigned bandwidth (e.g., 38.8 Mbs). For example, QAM-3 122-3 has Channel 6 through Channel 10 assigned to it and the bandwidth of the associated MABR pipe 502-3 includes respective allocations as follows: 20 Mbs MPEG-2 HD for Channel 6, 9 Mbs H.264 SD for Channel 7, 4 Mbs MPEG-2 SD for Channel 8, 4 Mbs MPEG-2 for Channel 9 and 1.6 Mbs MPEG-2 SD for Channel 10.

Figure 6:
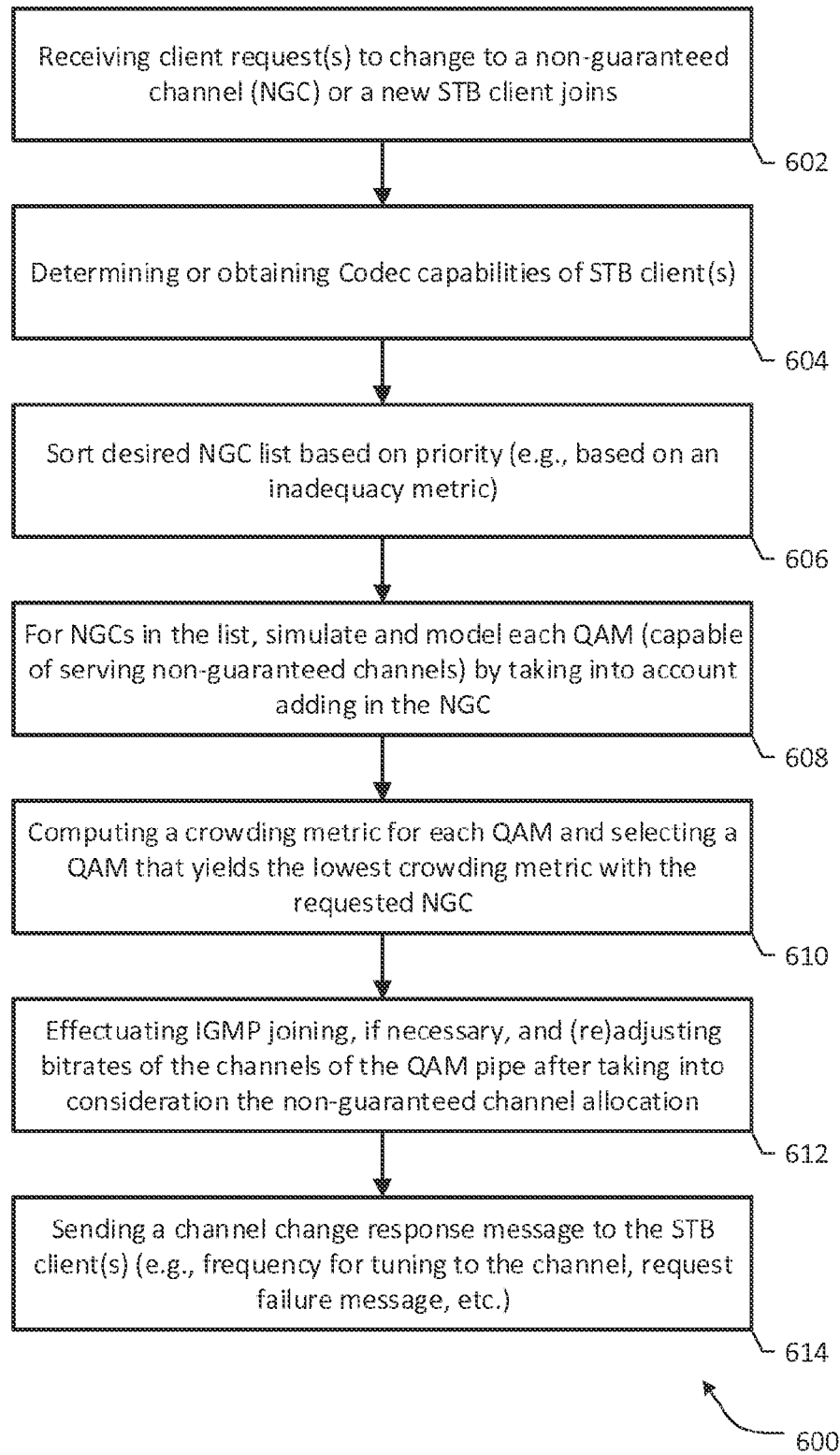
FIG. 6 is a flowchart of various blocks, steps, acts and/or functions that may take place at a network node for providing a non-guaranteed channel (i.e., switched channel) to a subscriber station in an implementation of the SDV network of FIG. 1.

Turning now to FIG. 6, depicted therein is a flowchart of a scheme 600 comprising various blocks, steps, acts and/or functions that may take place at a network node for providing a non-guaranteed channel (i.e., switched channel) to a subscriber station in an implementation of the SDV network of FIG. 1. At block 602, one or more requests from the subscriber stations are received for non-guaranteed channel(s) via suitable return path networks or two-way communication interfaces as described above. Additionally or alternatively, a new STB client may join by turning on a non-guaranteed channel. As these requests are for non-guaranteed channels, i.e., the channels may be dynamically mapped to different edge QAM devices, a multi-QAM pipe modeling scheme may be advantageously employed in accordance with the teachings herein. Broadly, in a two-level modeling/optimization scheme, various network states are simulated for each QAM without altering the existing QAM/channel pairings (which would disrupt STBs looking for specific frequencies). For each QAM, the scheme searches for the "optimal" distribution of bandwidth for each channel (including the new one). Once the optimal distribution is found, it is stored or otherwise remembered. After each QAM has a remembered, simulated, optimal bandwidth distribution, the scheme determines the most optimal among them using one of a variety of possible crowding metrics (such as, e.g., a metric indicative of which QAM allows the best average quality if modified). The selected QAM has its existing channels' bandwidth modified to match the simulated optimal QAM, and the new channel is added at the chosen simulated bandwidth. Accordingly, in one embodiment, no other QAMs, or their channels, may be modified in any way and the new channel (i.e., the requested non-guaranteed channel) is added to the select QAM device that can best handle it. Existing channels in the QAM device may be reduced in quality as needed to fit the new channel at its chosen bitrate.

Once all QAM pipes have been simulated to include the new channel (i.e., channel packing), a crowding metric (CM) is applied to each QAM simulation wherein a crowding metric is operative to map from the list of bitrates of various channels assigned to a QAM to a single number that can be compared to choose the least crowded QAM. Example CM implementations may use variables such as: $R\_j$=the bitrate of the j-th stream assigned to a QAM; $w\_j$=the weight of the j-th stream assigned to a QAM; $I\_j$=the inadequacy metric of the j-th stream (which could be $w\_j/R\_j$ as described previously); and $Qc$=QAM capacity (can be the bitrate), wherein an example CM may be defined as any one of the following functions:

$$CM = \text{arithmetic mean}(I\_j)$$

$$CM = \text{geometric mean}(I\_j)$$

$$CM = \text{harmonic mean}(I\_j)$$

$$CM = \max(I\_j)$$

$$CM = \min(I\_j)$$

It should be appreciated that each of the foregoing CM functions will yield a slightly different behavior but a policy manager may choose a particular formulation depending on implementation so as to assign a stream to a QAM based on that CM formulation. In one variant, the scheme is operative to assign the stream to the QAM that has the lowest CM value. Another variant may involve assigning the stream to the QAM guaranteed to have the lowest crowding metric after the stream has been assigned to that QAM (i.e., performing the calculations as if the stream has already been assigned to each QAM). Accordingly, one skilled in the art will recognize that in the multi-QAM, two-level modeling/optimization scheme, IM may be used first for channel packing with respect each QAM based on channel priorities and sorting, similar to the channel packing process set forth above for accommodating a guaranteed channel request. Thereafter, IM may also be used in CM optimization for selecting a particular QAM based on the CM values.

Returning to FIG. 6, a modeling scheme may therefore involve modeling a bandwidth pipe corresponding to each edge QAM device operative to support non-guaranteed channels by taking into account adding the requested non-guaranteed channel in order to determine which edge QAM device(s) can accommodate the requested non-guaranteed channel(s) (block 608). Similar to the processing of guaranteed channel requests, a codec arbitration process may be engaged (for instance as set forth in FIG. 3 and suitably modified, mutandis mutatis, e.g., optionally not having to determine channel to QAM mapping) such that STB clients' codec capabilities may be obtained (block 604). A list of non-guaranteed channels may sorted based on IM for each QAM (block 606). After modeling and simulation (block 608), a suitable CM may be computed for all edge QAM devices capable of accommodating the requested non-guaranteed channel, whereupon a particular edge QAM with a lowest CM value may be selected as described above (block 610). Bitrates of MABR streams of existing channels of the particular edge QAM device may be adjusted to accommodate a particular MABR stream having a select bitrate of the requested non-guaranteed channel. Further, appropriate IGMP Join operations may be effectuated, if necessary, as well as (re)adjusting the bitrates of the channels, to join MABR streams of the existing channels and the requested non-guaranteed channel to correct IGMP groups in order to facilitate streaming of the channels via the particular edge QAM device. These operations are exemplified at block 612. Thereafter, SRM/ERM node of the SDV network 100 (shown in FIG. 1) is operative to send a channel change response message to the requesting STB client(s), e.g., including one or more channel frequencies to tune to in the case of successful channel accommodation, or request failure messages (if the requested channel cannot be accommodated, etc.), as set forth at block 614.

Figure 7:
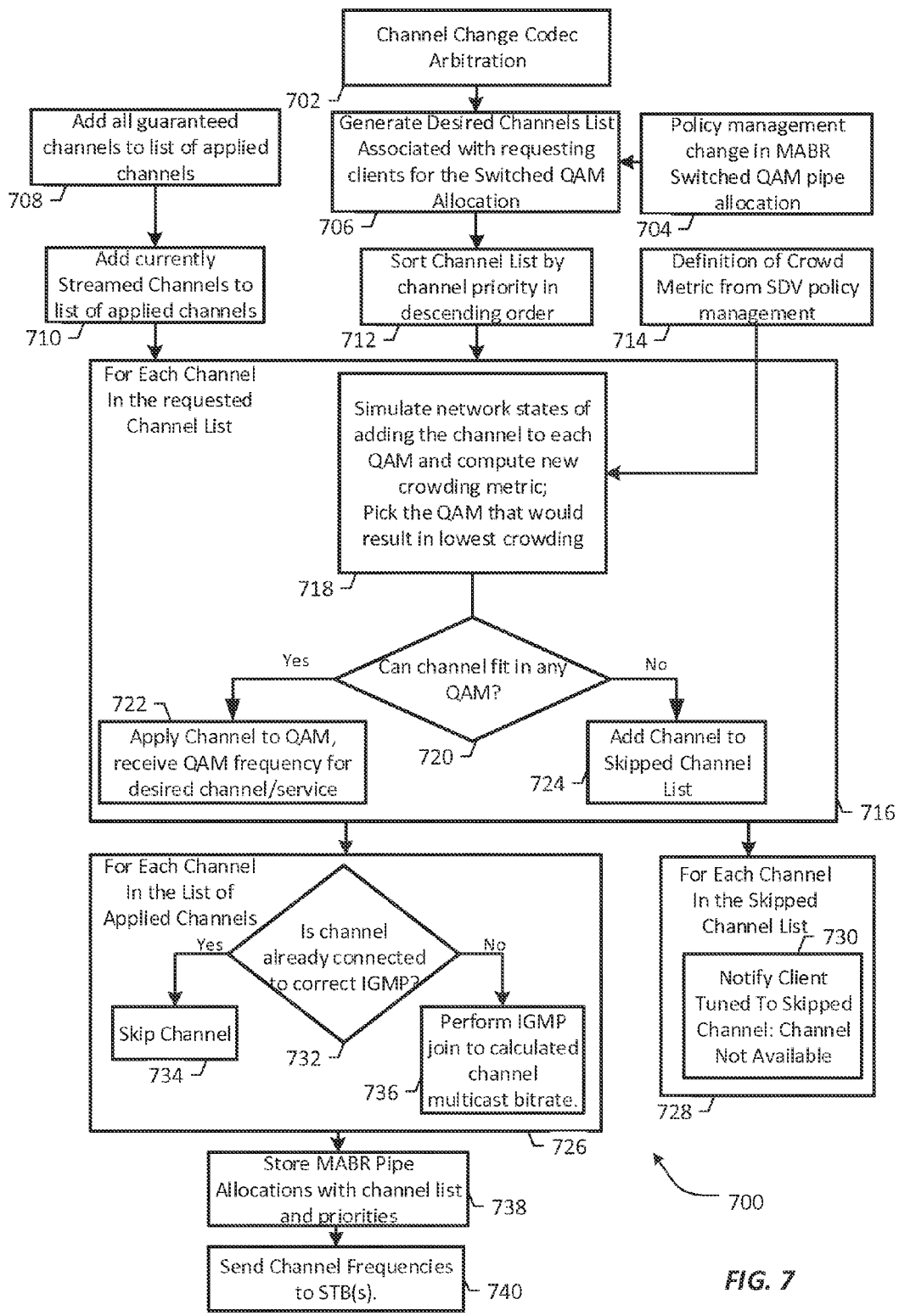
FIG. 7 is a flowchart of an example channel allocation process using MABR that may be engaged as part of the process of FIG. 6 for providing a non-guaranteed channel according to an embodiment of the present patent application.

FIG. 7 is a flowchart of an example channel allocation process 700 that may be executed as part of the process of FIG. 6 for providing a non-guaranteed channel according to an embodiment of the present patent application. Similar to the process 400 set forth in FIG. 4, the allocation process 700 may commence from a channel change codec arbitration (block 702) and/or from a policy management change with respect to switched QAM pipe allocation (block 704). At block 706, a list of all desired channels associated with the requesting client(s) may be generated. As noted elsewhere, such clients can be traditional STBs, ABR-capable STBs, or other content consuming devices. The list of channels may be sorted based on a suitable metric, e.g., channel priority, IM, etc, in a descending order (block 712). Currently streamed channels as well as guaranteed channels are added to the list of applied channels (blocks 708 and 710). For each channel in the requested list, a bandwidth annealing loop 716 may be executed based on a CM definition from the SDV policy management (block 714). At block 718, network states responsive to adding a requested channel to each QAM are simulated, whereupon a CM for that QAM is computed. Based on the CM values computed for the QAMs, a particular QAM is picked that would result in least crowding. As part of the network state simulation process or in conjunction therewith, a decision block 720 is operative to determine if the channel can fit in a QAM. If so, the channel is assigned/applied to the QAM, whereupon the associated QAM frequency information for the desired channel/service may be obtained (block 722). If the requested channel does not fit in any QAM, it may be added to a skipped channel list (block 724). Upon completion of the annealing loop 716, the process 700 enters an IGMP verification loop 726 in order to ensure that each channel stream of the list of applied channels is joined to correct IGMP. If the channel is already connected to the correct IGMP multicast (block 732), there is no need to change the connection and IGMP operations for the channel stream may be skipped (block 734). If the MABR channel is not already connected to the correct IGMP multicast, an IGMP Join is performed to join the calculated multicast bitrate channel (block 736). With respect to the skipped channels that could not be accommodated (block 724), a notification loop 728 may be executed wherein the client may be informed that the requested channel is not available (block 730). After all channels of the applied list of channels are correctly connected, the allocation process 700 stores MABR pipe allocations with channel list and priorities, applies the pipe model to the selected QAM pipe disposed between the IGMP-capable switch and the particular QAM and forwards channel frequencies to the requesting STB station(s), as set forth at blocks 738 and 740.

Figure 8A:
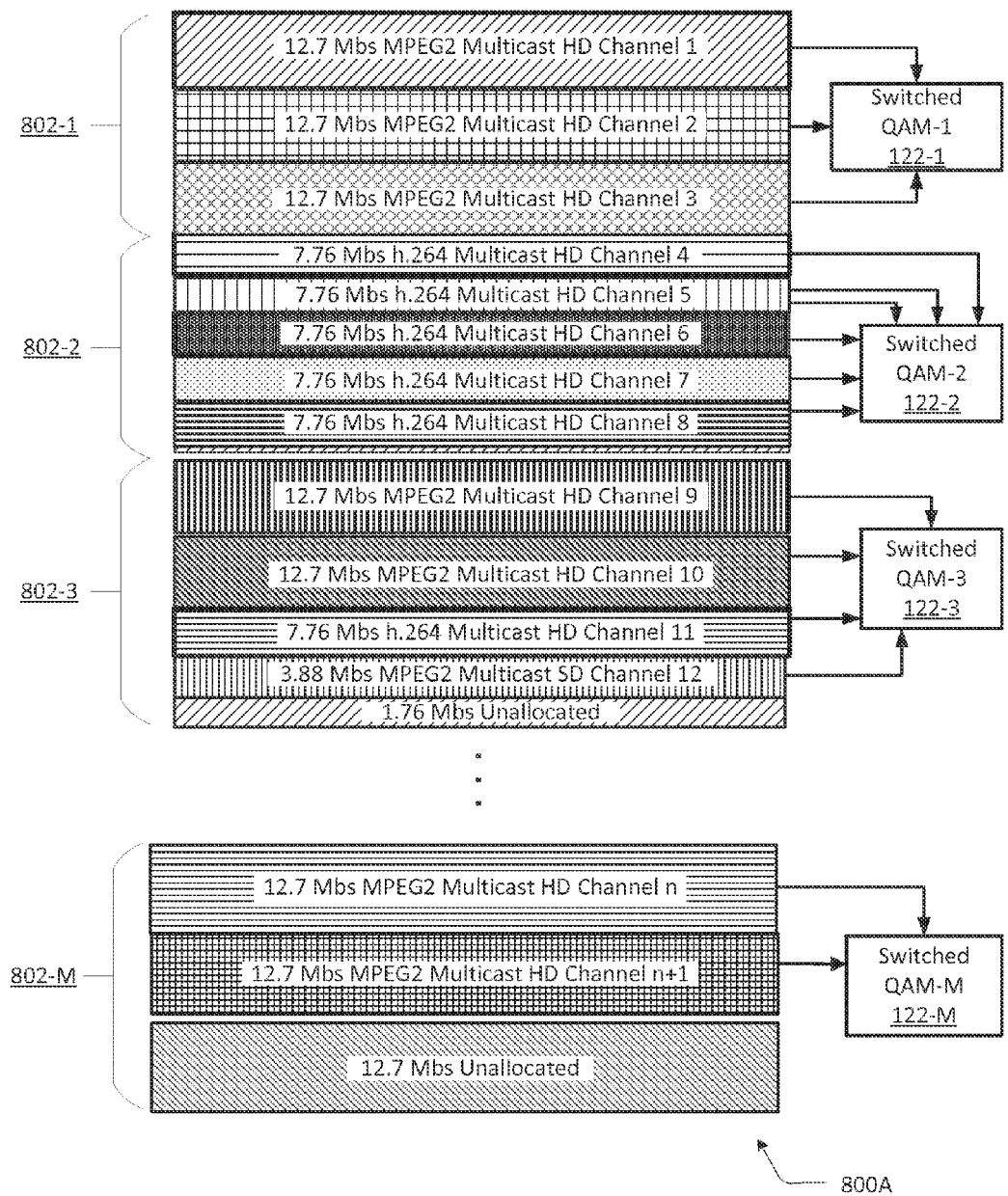
FIGS. 8A-8C depict example QAM pipe bandwidth allocations for accommodating requests for non-guaranteed channels.
Figure 8B:
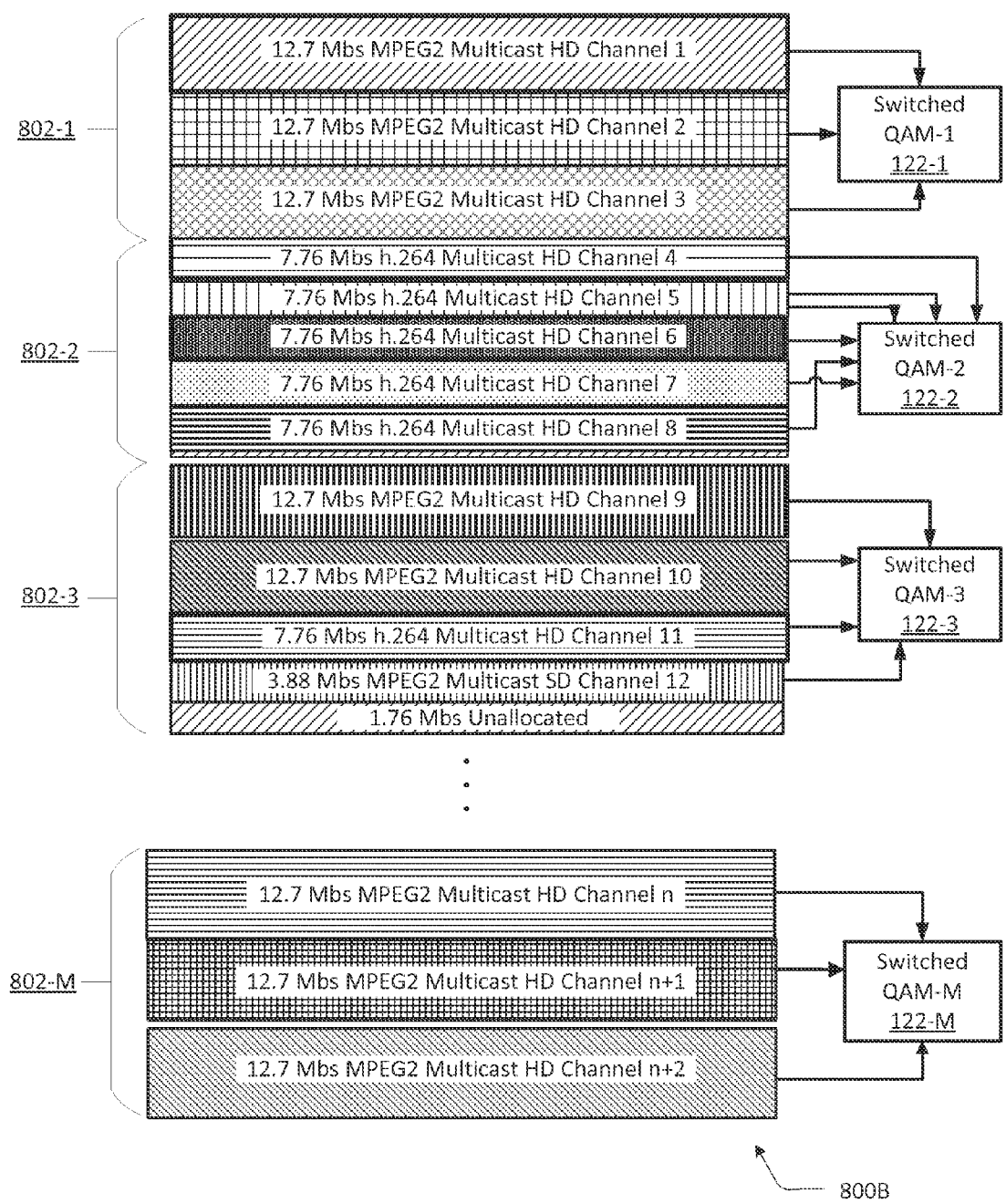
Figure 8C:
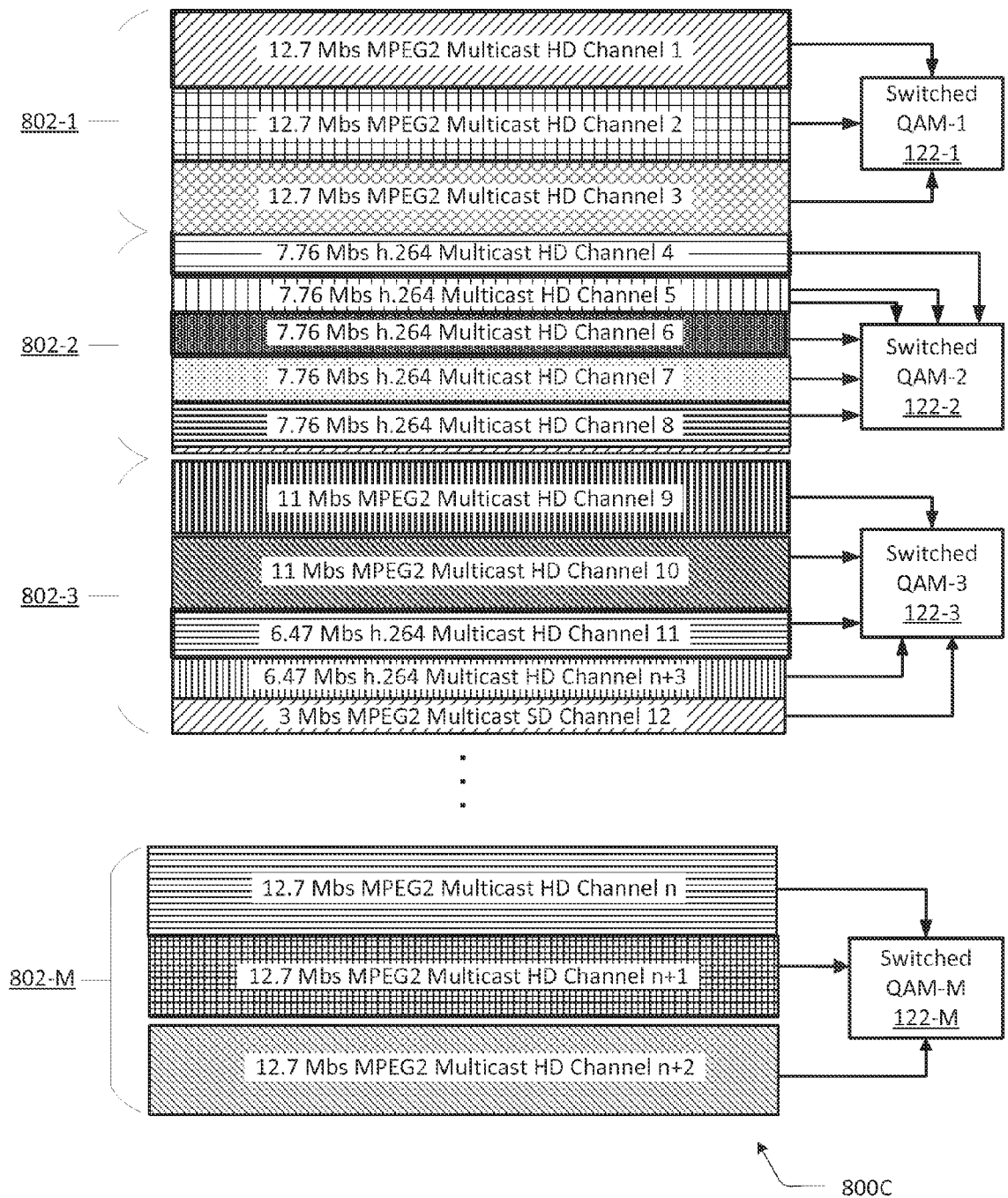

FIGS. 8A-8C depict example QAM pipe bandwidth allocations for accommodating requests for non-guaranteed channels. Reference numeral 800A in FIG. 8A refers to the state of the bandwidth allocation in a variety of QAMs 122-1 to 122-M with unallocated space in both QAM-3 122-3 and QAM-M 122-M. A plurality of channels are distributed among M virtual pipes 802-1 to 802-M serving respective QAMs. Each stream is allocated its maximum possible bitrate within its bandwidth pipe. Similar to the pipe allocation scenario set forth in FIG. 5, example codecs MPEG-2 and H.264 may support bitrates for both HD and SD streams of requested non-guaranteed channels at various levels of bitrate granularity. Illustratively, MPEG-2 bitrates per service may comprise: 12.7 Mbs, 11 Mbs and 9.5 Mbs for HD service and 3.88 Mbs, 3 Mbs, 2.5 Mbs and 2.0 Mbs for SD service. Likewise, H.264 bitrates per service may comprise: 7.76 Mbs, 6.47 Mbs and 5 Mbs for HD service and 2.2 Mbs, 1.4 Mbs, 1.0 Mbs, 800 Kbs and 500 Kbs for SD service. In FIG. 8B, reference numeral 800B refers to an example scenario where a new multicast channel (MPEG-2 multicast HD Channel n+2) is requested wherein a 12.7 Mbs stream is sent to QAM-M 122-M, requiring no bandwidth changes for any stream associated with QAM-M (because it fits in the pipe having 38.8 Mbs bandwidth); with only routing of the new requested channel being effectuated. In FIG. 8C, reference numeral 800C refers to a scenario where an additional stream (H.264 multicast HD Channel n+3) is requested that is added to QAM-3 122-3 (a 6.47 Mbs representation) based on a multi-level optimization scheme of the present invention, which addition requires the bandwidth to be reduced for the streams in QAM-3 (as per ABR pipe modeling principles herein). However, other QAMs remain unaffected. It should be appreciated that the additional stream is advantageously added to QAM-3 (rather than being rejected as in current SDV systems because of lack of the bandwidth).

Figure 9:
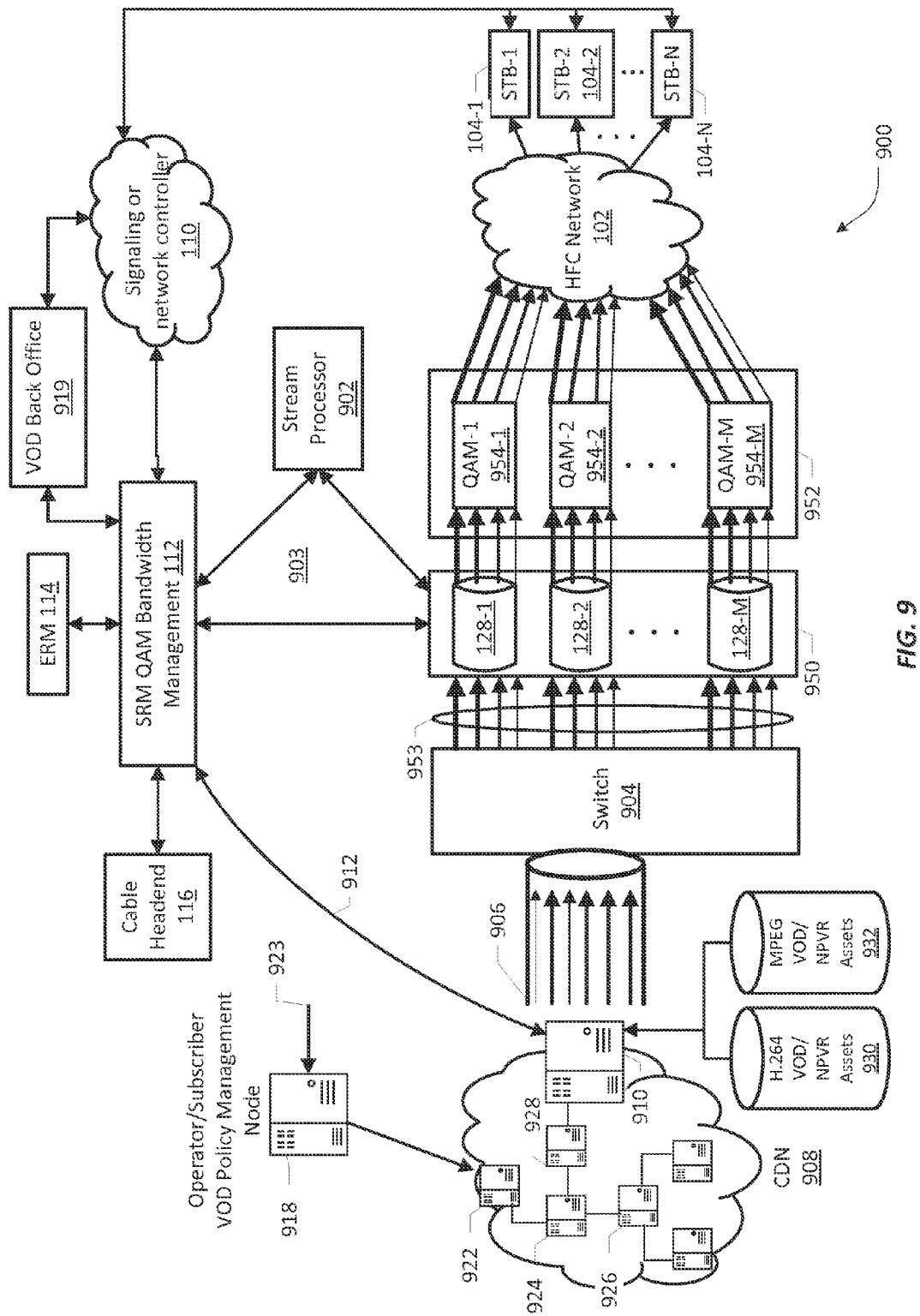
FIG. 9 depicts an example SDV network wherein one or more embodiments of the present patent application may be practiced for providing video-on-demand (VOD) or network personal video recorder (NPVR) channels from a content delivery network (CDN)

FIG. 9 depicts an example SDV network environment 900 wherein one or more embodiments of the present patent application may be practiced for providing stored content channels (e.g., VOD/NPVR channels, collectively just VOD channels for short) from a content delivery network (CDN) 908. One skilled in the art will recognize that the SDV environment 900 is substantially similar to the SDV environment 100 depicted in FIG. 1 and, accordingly, the description of FIG. 1 set forth above is equally applied to FIG. 9, mutatis mutandis. Subscriber stations 104-1 to 104-N are operative to receive VOD content via the HFC network 102 that may be coupled to one or more edge QAMs 954-1 to 954-M, which may comprise dedicated VOD-specific QAMs or shared QAMs supporting diverse services (e.g., guaranteed channels, non-guaranteed channels, broadcast channels as well as VOD channels), or any combination thereof. A bandwidth pipe 950 serving the VOD QAM bank 952 may likewise comprise a plurality of VOD-specific virtual pipes and/or virtual pipes operative to support a combination of services. In one implementation, a gateway switch 904 associated with the SDV distribution hub is operative to receive unicast ABR streams of content that have been stitched and combined at a segment switcher/combiner associated with a CDN edge delivery node 910 via a unicast pipe 906. It should be appreciated that the UABR content streams delivered by the edge delivery node 910 are not gapped and as they are being unicast, no IGMP Join operations need to be performed by switch 904. Accordingly, switch 904 does not have to be an IGMP-capable switch in the example SDV network implementation 900. Preferably, UABR bandwidth management operations may be performed by server side at the SRM/ERM 112/114 node(s) in conjunction with stream processor 902. Together, these nodes are operative to determine which QAMs to send unicast streams 953 to, in addition to performing policy weighting and other bandwidth control decisions, inter alia. The foregoing Interactions among the SRM/ERM and stream processor nodes may also be implemented in an integrated or coupled fashion wherein the entities may form an apparatus or system 903 for facilitating delivery of VOD sessions in the example SDV network 100. As will be described in further detail below, clients make VOD channel requests, which trigger QAM routing and bandwidth distribution process, and receive appropriate response messages (e.g., the channel frequency to tune to or an error message).

For purposes of the present VOD delivery embodiment, CDN 908 may comprise an overlay network architected for high-performance streaming of a variety of digital assets or program assets as well as services (referred to as "content" herein) to subscribers using one or more Internet-based infrastructures, private/dedicated infrastructures or a combination thereof. In general, the terms "content" or "content file" as used in reference to at least some embodiments of the present patent disclosure may include digital assets and program assets such as any type of audio/video content or program segment, streaming or static (e.g., recorded over-the-air free network TV shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using ABR streaming session and/or non-ABR progressive download sessions. In general, the overlay architecture of CDN 908 may include a multi-level, hierarchically-organized interconnected assembly of network servers for providing media pathways or "pipes" from one or more central distribution nodes to one or more levels of regional distribution nodes that are connected to one or more local edge servers, e.g., edge node 910, for facilitating content delivery to edge QAMs 954-1 to 954-M via switch 904. In addition to such "distribution servers" (sometimes also referred to as "surrogates"), CDN 908 may also include and/or interoperate with various network elements configured to effectuate request redirection or rerouting mechanisms as well as related back office systems or nodes such as operator/subscriber policy management systems, bandwidth scheduling systems, account/billing systems, and the like, that may be deployed as part of the associated back office infrastructure. In FIG. 9, an example subscriber/operator VOD policy management system 918 may deployed in conjunction with VOD back office node 919, with a suitable communication interface 923 provided therebetween. Additional back office infrastructure may include operator pipe and content policy node(s), subscriber device profile and priority definition node(s), in addition to streaming policy server node(s), billing node(s) and a subscriber authentication node(s), which are not explicitly shown in FIG. 9 for clarity reasons.

CDN 908 is exemplified with a redirector node 922 and a central origin server node 924 that is operative to distribute content to a plurality of regional nodes, e.g., nodes 926, 928, and ultimately to the edge delivery node 910 configured to provide content to switch 904 under SRM/ERM's VOD QAM bandwidth management. A communication interface 912 provided between the edge delivery node 910 and SRM/ERM is operative to facilitate various interactions relative thereto. ABR-friendly encoded content segments may be stored at the edge delivery node 910 in suitable network file storage (NFS)/cache structures, e.g., NFS databases 930 and 932, which encoded content may comply with one or more codecs such as MPEG, H.264, H.265, etc. at varying levels of bitrates/quality. For instance, NFS 930 may comprise segments of an H.264-based VOD/NPVR asset at 7.76 Mbs to 800 Kbs rates, with a suitable demarcation between SD and HD segments. Likewise, NFS 932 may comprise segments of an MPEG-based asset at 17.2 Mbs to 2.25 Mbs that may be separated into HD or SD based on a select bitrate demarcation. In addition to the encoded content segments, manifest data associated therewith may also be provided at the edge delivery node 910.

As noted above, the edge delivery node 910 is operative to interface with SRM/ERM's VOD QAM bandwidth management functionality for effectuating delivery of requested VOD content. In the example SDV network environment 900, VOD back office 919 is operative to receive subscriber requests for VOD content using appropriate return path signaling and/or two-way communications interfacing as described previously. Preferably, subscriber requests may include STB identifier information, capability information, etc., in addition to the requested content information. Responsive thereto, upon approval and authentication of the requesting subscriber, VOD back office 919 provides a notification of the request to the SRM/ERM node(s) 112/114, which may interrogate the cable headend 116 for applicable STB properties based on the STB identifier. Upon obtaining the STB properties, SRM/ERM 112/114 may generate a manifest request to the edge delivery node 910 based on proper codec determination for the requested VOD asset. Upon receiving a suitable response including the manifest and encoded bitrate information, SRM/ERM 112/114 is operative to filter out bitrates (e.g., based on whether HD or SD quality content is requested) for use in bandwidth streaming control. SRM/ERM 112/114 is further operative to send a request to a unicast segment streamer (not specifically shown in FIG. 9) provided with the edge delivery node 910 to commence streaming at correct bitrate and correct unicast address determined by its VOD QAM bandwidth management functionality. After performing appropriate QAM pipe modeling, annealed pipe model information (i.e., a selected edge QAM as well as any bandwidth reallocation with respect to the associated VOD pipe) may be provided to the stream processor node 902 for modifying the pipe channels accordingly. Where the requested channel can be accommodated, SRM/ERM 112/114 obtains appropriate QAM frequency information and sends it out to the requesting client.

Figure 10:
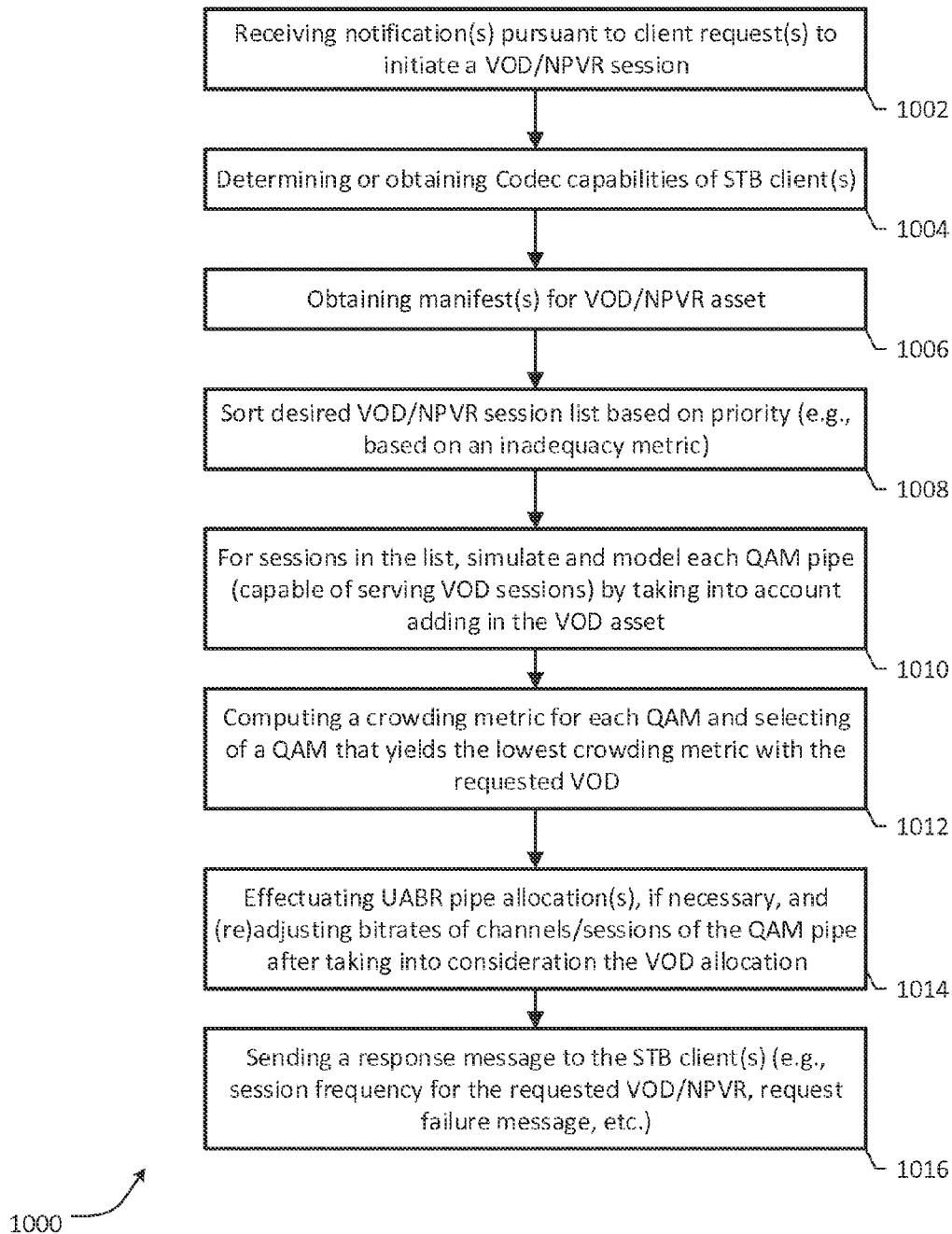
FIG. 10 is a flowchart of various blocks, steps, acts and/or functions that may take place at a network node for providing a VOD/NPVR channel to a subscriber station in an implementation of the SDV network of FIG. 9.

The foregoing VOD delivery scheme is exemplified in FIG. 10 as a flowchart of a process 1000 with various blocks, steps, acts and/or functions depicting additional/alternative features. At block 1002, a network node is operative to receive a notification from a VOD back office pursuant to a request received from the subscriber station to initiate a VOD session. At block 1004, codec capabilities of the subscriber station may be obtained. A manifest for the requested VOD session based on quality of service and codec capabilities of the subscriber station is obtained at block 1006. A list of desired VOD/NPVR sessions is sorted based on metrics such as priority, weight, IM, and the like (block 1008). A bandwidth pipe corresponding to each edge QAM device is simulated and modeled by taking into account adding the requested VOD session in order to determine which edge QAM devices can accommodate the requested VOD session (block 1010). A crowding metric for all edge QAM devices capable of accommodating the requested VOD session is computed and a particular edge QAM with a lowest crowding metric value may be selected (block 1012). Bitrates of UABR streams of existing VOD sessions of the particular edge QAM device may be adjusted to accommodate a particular UBAR stream having a select bitrate for the requested VOD session. Thereafter, UABR allocations of the bandwidth pipe of the particular edge QAM device for the existing VOD sessions and the requested VOD session may be effectuated. These operations are exemplified at block 1014. A suitable response message, e.g., including one or more VOD session frequencies, a failure message that the requested VOD sessions cannot be accommodated, etc., may be sent to the to the requesting subscriber stations (block 1016).

Figure 11:
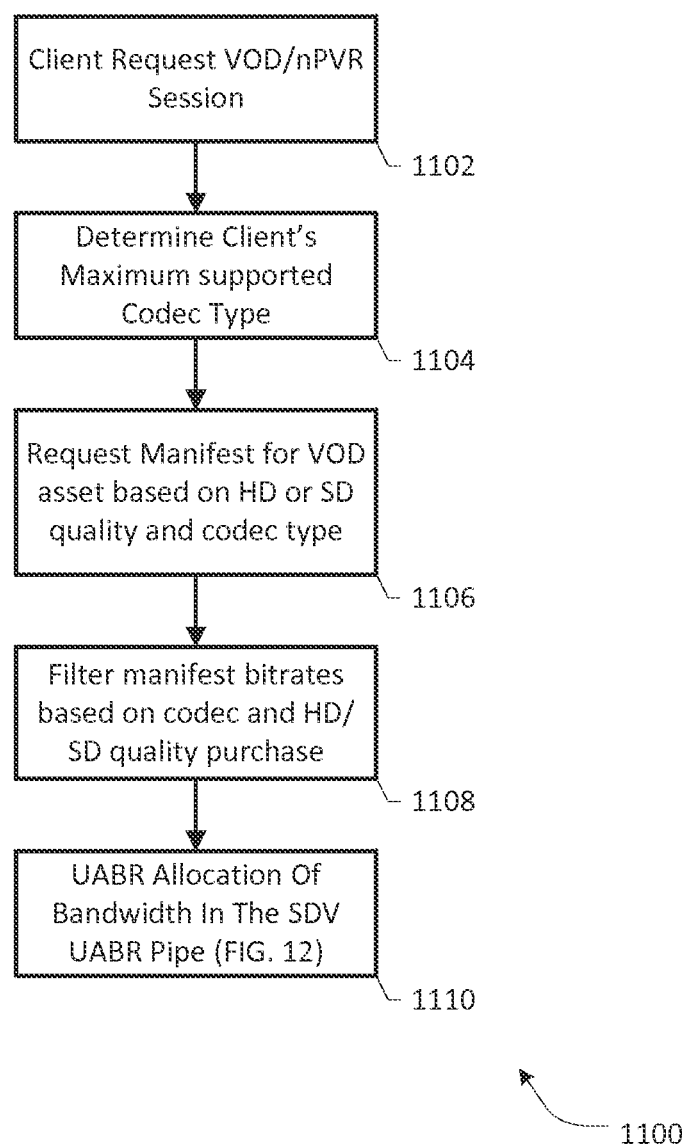
FIG. 11 is a flowchart of an example codec arbitration process that may be engaged for facilitating delivery of VOD/NPVR channels in an implementation of the SDV network of FIG. 9.

FIG. 11 is a flowchart of an example VOD codec arbitration process 1100 that may be executed in conjunction with facilitating delivery of VOD/NPVR channels in an implementation of the SDV network of FIG. 9. At block 1102, a client request for a VOD session is generated, received or otherwise obtained. At block 1104, the requesting client's maximum supported codec type is determined. At block 1106, a request for manifest information for the VOD asset is generated based on whether HD or SD quality is requested, codec type, etc. Additionally or alternatively, any bitrates identified in the received manifest may be filtered based on similar criteria (block 1108). Thereafter, a bandwidth allocation process may take place (block 1110) with respect to one or more UABR pipes, e.g., pipes 128-1 to 128-M of FIG. 9, as set forth in further detail in FIG. 12.

Figure 12:
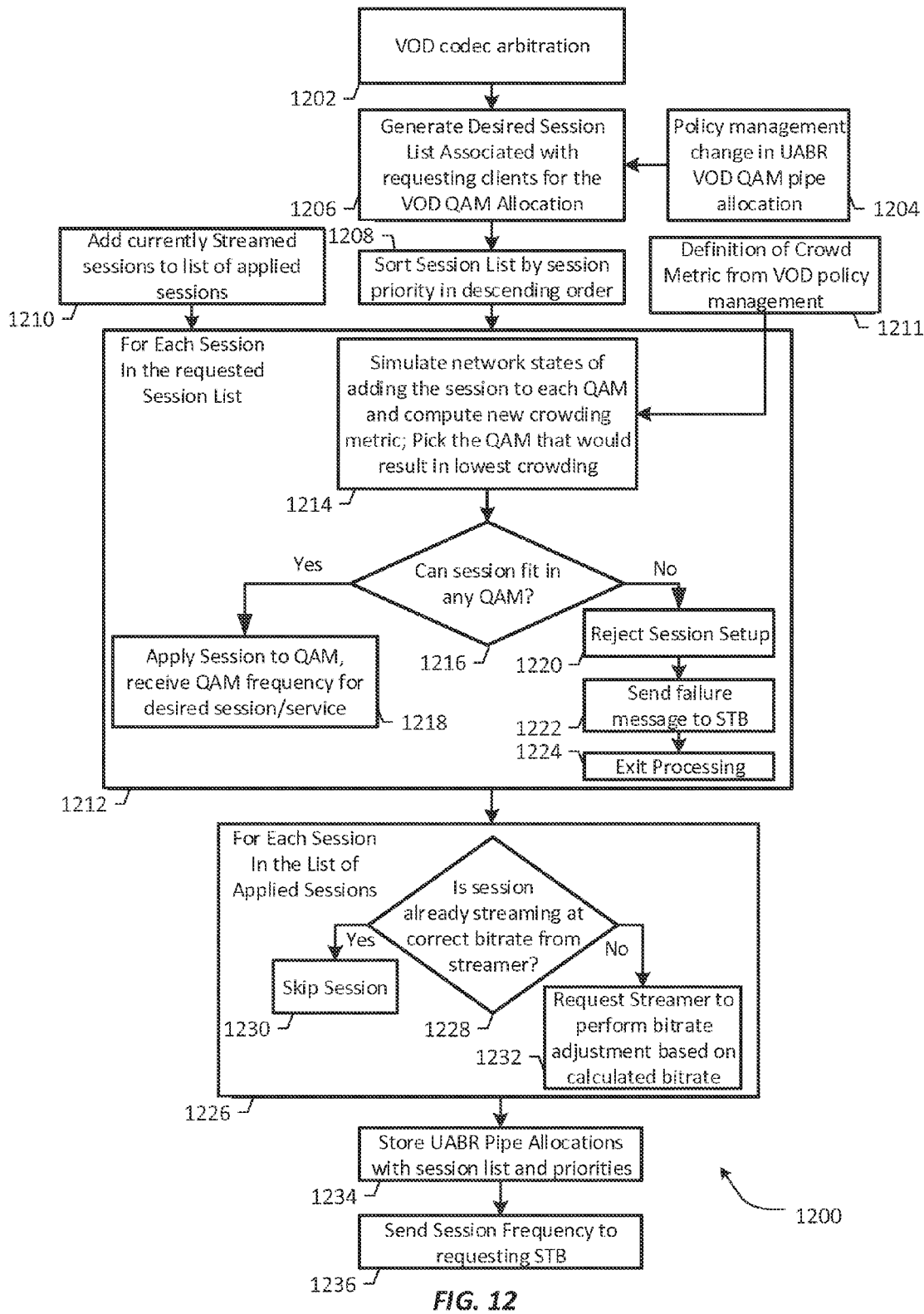
FIG. 12 is a flowchart of an example channel allocation process using unicast ABR (UABR) that may be engaged as part of the process of FIG. 10 for providing a VOD/NPVR channel according to an embodiment of the present patent application.

In FIG. 12, an example channel allocation process 1200 is depicted that may be executed as part of the process of FIG. 10 for providing a VOD channel or session according to an embodiment of the present patent application. Similar to the process 700 set forth in FIG. 7, the allocation process 1200 may commence from a VOD session setup codec arbitration process (block 1202) and/or from a policy management change with respect to UABR QAM pipe allocation (block 1204). At block 1206, a list of all desired VOD sessions associated with the requesting client(s) may be generated. The list of sessions may be sorted based on a suitable metric, e.g., channel priority, IM, etc, in a descending order (block 1208). Currently streamed VOD sessions are added to the list of requested VOD sessions (block 1210). For each session in the requested list, a bandwidth annealing loop 1212 may be executed based on a CM definition from the VOD policy management (block 1211). At block 1214, network states responsive to adding a requested session to each QAM are simulated, whereupon a CM for that QAM is computed. Based on the CM values computed for the QAMs, a particular QAM is picked that would result in least crowding. As part of the network state simulation process or in conjunction therewith, a decision block 1216 is operative to determine if the session can fit in a QAM. If so, the session is assigned/applied to the QAM, whereupon the associated QAM frequency information for the desired session/service may be obtained (block 1218). If the requested session does not fit in any QAM, the session setup is rejected or otherwise aborted (block 1220), with suitable messaging to the requesting STB (block 1222). The process flow may thereafter terminate (block 1224).

In the event that the requested VOD session can be accommodated in QAMs, the process 1200 enters a stream verification loop 1226 with respect to each session in the list of applied sessions. If the session is already streaming at a correct bitrate from the unicast segment streamer of the edge delivery node, the stream is skipped (block 1230). Otherwise, the segment streamer is requested to perform bitrate adjustment (block 1232). Thereafter, the UABR pipe allocations of the selected QAM along with the sessions and priorities are stored (block 1234) and applicable session frequency information is transmitted to the requesting STB(s) for tuning (block 1236).

It should be appreciated that in the SDV-based VOD delivery scheme set forth above, VOD streams can be sent to legacy STB devices with the flexibility of an ABR solution. The server modifies the sent out bitrates of the content based on network conditions. Because the streamed video is unicast (rather than multicast), the video can be treated like traditional VOD, e.g., including trick modes, customized advertising, etc.

Figure 13A:
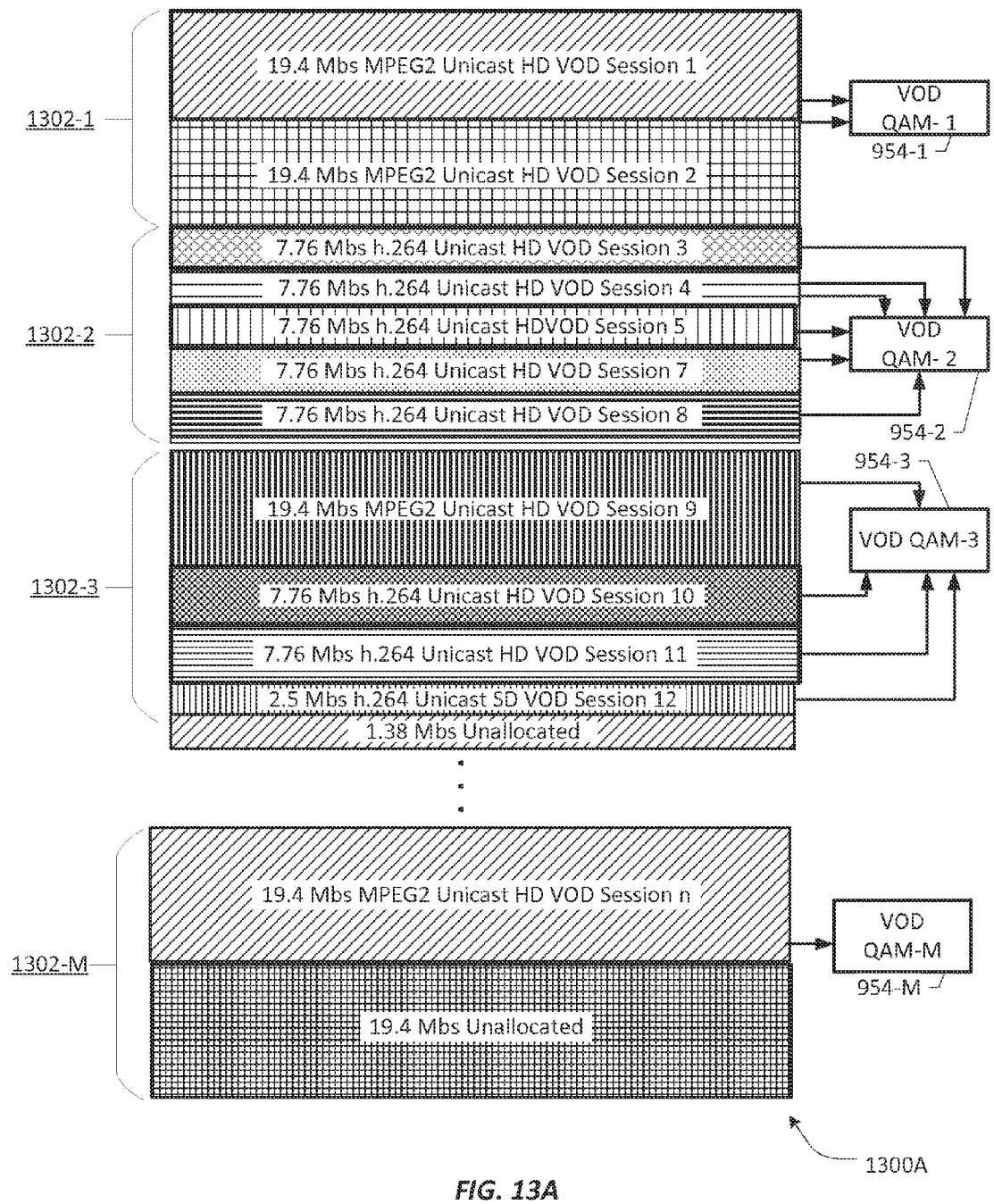
FIGS. 13A-13C depict example QAM pipe bandwidth allocations for accommodating requests for VOD/NPVR channels.
Figure 13B:
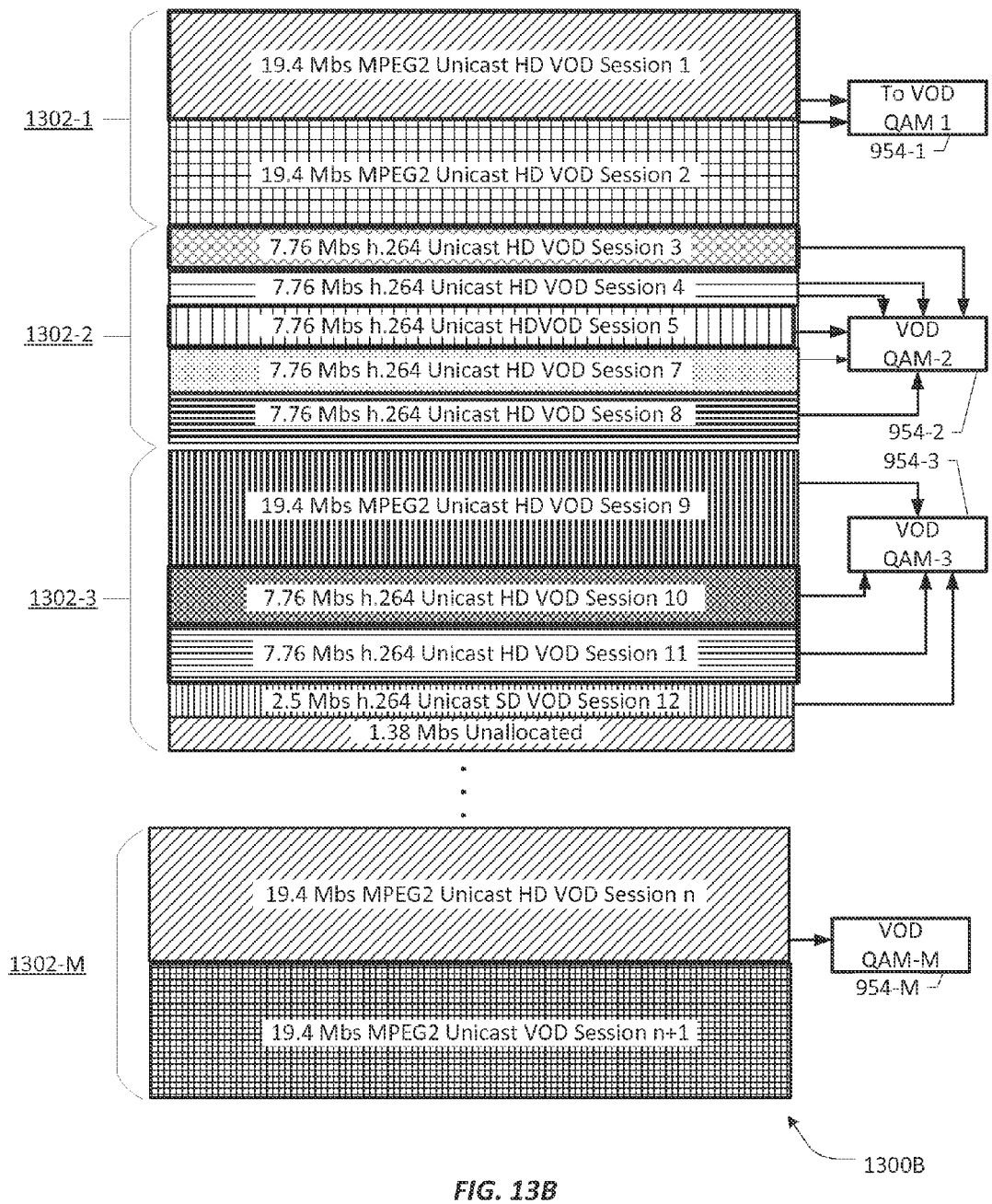
Figure 13C:
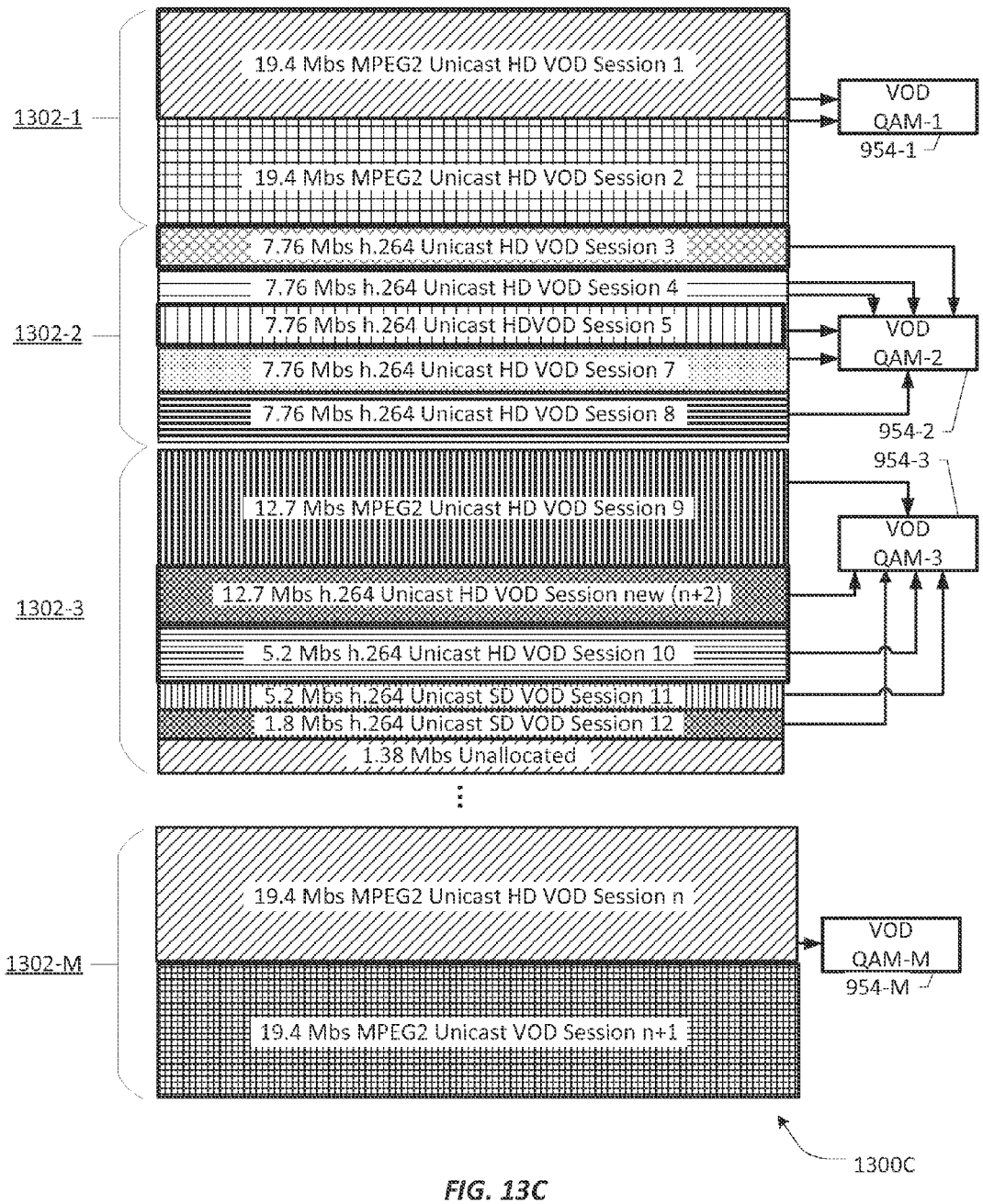

FIGS. 13A-13C depict example QAM pipe bandwidth allocations for accommodating VOD session requests in the SDV environment 900 described above. FIG. 13A shows the state of the bandwidth allocation 1300A in a variety of QAMs with unallocated space in both QAM-3 954-3 and QAM-M 954-M. A plurality of sessions are illustratively distributed among UABR VOD bandwidth pipes 1302-1 to 1302-M serving respective QAMs 954-1 to 954-M. Each stream may be allocated its maximum possible bitrate within its bandwidth pipe. Similar to the pipe allocation scenarios set forth in FIG. 5 or FIGS. 8A-8C, example codecs MPEG-2 and H.264 may support bitrates for both HD and SD streams of requested VOD/NPVR sessions at various levels of bitrate granularity. Illustratively, MPEG-2 bitrates per service may comprise: 19.4 Mbs, 15.5 Mbs, 12.7 Mbs, 11.5 Mbs and 10.3 Mbs for HD service and 4.85 Mbs, 3.75 Mbs, 3.0 Mbs, 2.75 Mbs and 2.25 Mbs for SD service. Likewise, H.264 bitrates per service may comprise: 7.76 Mbs, 6.3 Mbs, 5.2 Mbs, 4.1 Mbs and 3.6 Mbs for HD service and 2.5 Mbs, 1.8 Mbs, 1.2 Mbs, 1.0 Mbs and 800 Kbs for SD service. In FIG. 13B, reference numeral 1300B refers to an example scenario where a new unicast VOD stream (MPEG-2 unicast HD Channel n+1) is requested wherein a 19.4 Mbs stream is sent to QAM-M 954-M, requiring no bandwidth changes for any stream associated with QAM-M (because it fits in the pipe having 38.8 Mbs bandwidth); with only routing of the new requested session being effectuated. In FIG. 13C, reference numeral 1300C refers to a scenario where an additional new stream (H.264 unicast HD Channel n+2) is requested that is added to QAM-3 954-3 (a 12.7 Mbs representation) based on a multi-level optimization scheme of the present invention, which addition requires the bandwidth to be reduced for one or more sessions of QAM-3 (e.g., Session 9 is reduced from 19.4 Mbs to 12.7 Mbs as per the ABR pipe modeling principles herein). However, the remaining QAMs are left unaffected. It should be appreciated that the additional stream is advantageously added to QAM-3 (rather than the session request being rejected as in current VOD systems because of lack of the bandwidth).

Figure 14:
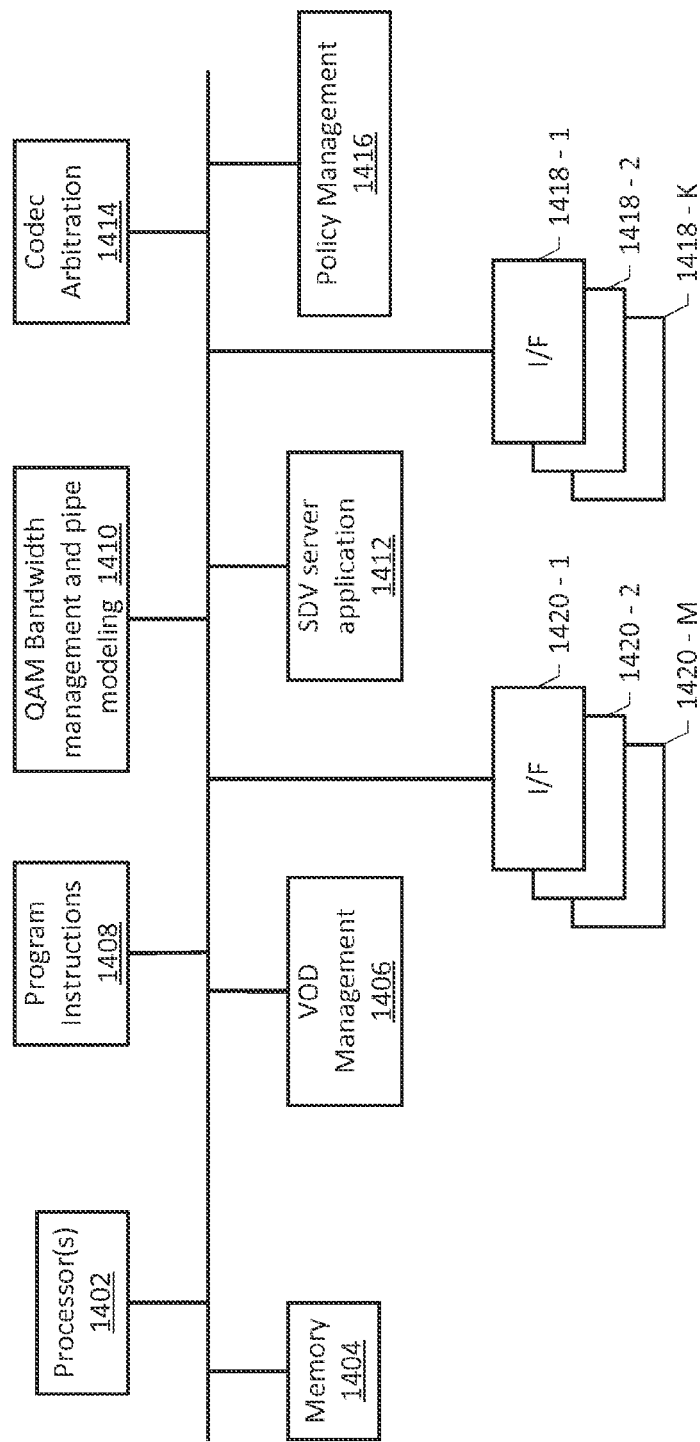
FIG. 14 depicts a block diagram of an example resource manager node in the SDV implementation of FIG. 1 or FIG. 9 according to an embodiment of the present patent application.

FIG. 14 depicts a block diagram of an example resource manager node 1400 in the SDV implementation of FIG. 1 or FIG. 9 according to an embodiment of the present patent application. Depending on the implementation, resource manager node or apparatus 1400 may be configured as an SRM node, an ERM node, an SDV application server, or a combination thereof. One or more processors 1402 may be operatively coupled to various modules that may be implemented in persistent memory for executing suitable program instructions or code portions with respect to one or more processes set forth hereinabove for servicing requests for guaranteed channels, non-guaranteed channels or VOD/NPVR sessions from clients. A QAM bandwidth management and pipe modeling module 1410 is operative to perform various processes relating to IM and CM computations, bandwidth annealing and allocation, etc. as discussed above. A codec arbitration module 1414 is operative to execute a video codec selection process for the requesting STBs, which may involve interactions with a headend for obtaining/determining the codec properties under suitable program instructions, e.g., program instructions 1408. Also, VOD management module 1406 for interfacing with VOD edge delivery nodes, SDV server application module 1412, and policy management module 1416 for providing IM/CM definitions, bandwidth policies relating to MABR/UABR channels, etc., are operative under control of processor(s) 1402 executing suitable program instructions 1408 and/or other memory modules 1404. Appropriate interfaces (I/F) 1420-1 to 1420-M are operative to effectuate channel change request/response messages to and from STBs. Likewise, appropriate interfaces 1418-1 to 1418-K to various network elements and/or nodes (e.g., headends, stream processors, VOD back office nodes, edge delivery nodes, edge QAM banks, return path controllers, and the like) may be provided in an example network node implementation.

Figure 15:
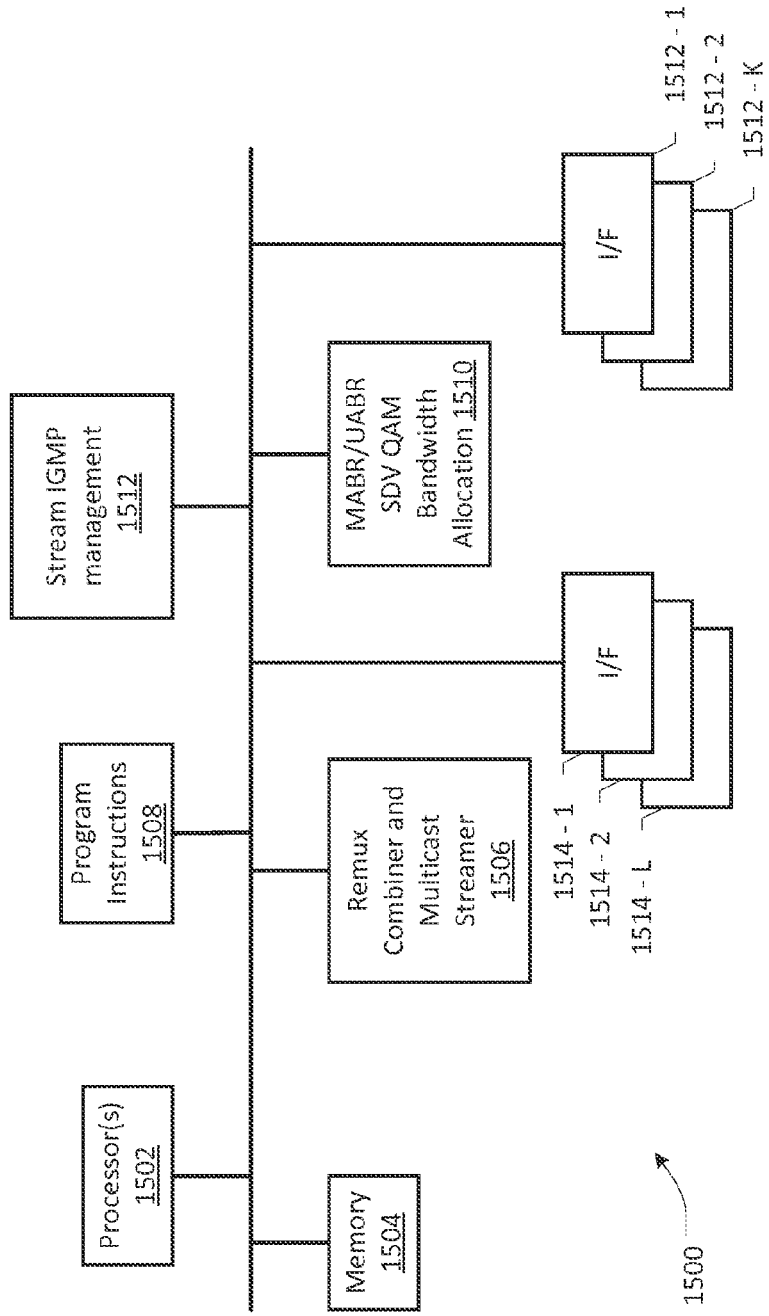
FIG. 15 depicts a block diagram of an example stream processor node in the SDV implementation of FIG. 1 or FIG. 9 according to an embodiment of the present patent application.

FIG. 15 depicts a block diagram of an example stream processor node 1500 in the SDV implementation of FIG. 1 or FIG. 9 according to an embodiment of the present patent application. One or more processors 1502 may be operatively coupled to various modules that may be implemented in persistent memory for executing suitable program instructions or code portions with respect to one or more processes set forth hereinabove for facilitating QAM bandwidth allocations, channel re-muxing, etc. A stream IGMP management module 1512 is operative to perform various processes for generating appropriate signals to an IGMP switch for joining the requested channels based on QAM-to-channel mapping and modeling. A remux combiner and multicast streamer 1506 is operative to de-gap and stitch the multicast channel streams for injecting into edge QAMs based on the channel mapping as discussed above. A MABR QAM bandwidth allocation module (for guaranteed or non-guaranteed channels) or UABR QAM bandwidth allocation module (for VOD sessions) 1510 is operative to apply pipe modeling results to the QAM pipes as necessary under suitable program instructions, e.g., program instructions 1508 and/or other code portions in memory 1504. Appropriate interfaces (I/F) 1514-1 to 1514-L are operative to effectuate communications with SRM/ERM nodes, IGMP switches, unicast switches, and the like. In similar fashion, interfaces 1512-1 to 1512-K are operative to effectuate communications with a plurality of QAMs organized into one or more QAM banks in an HFC network of the example SDV implementation.

Figure 16:
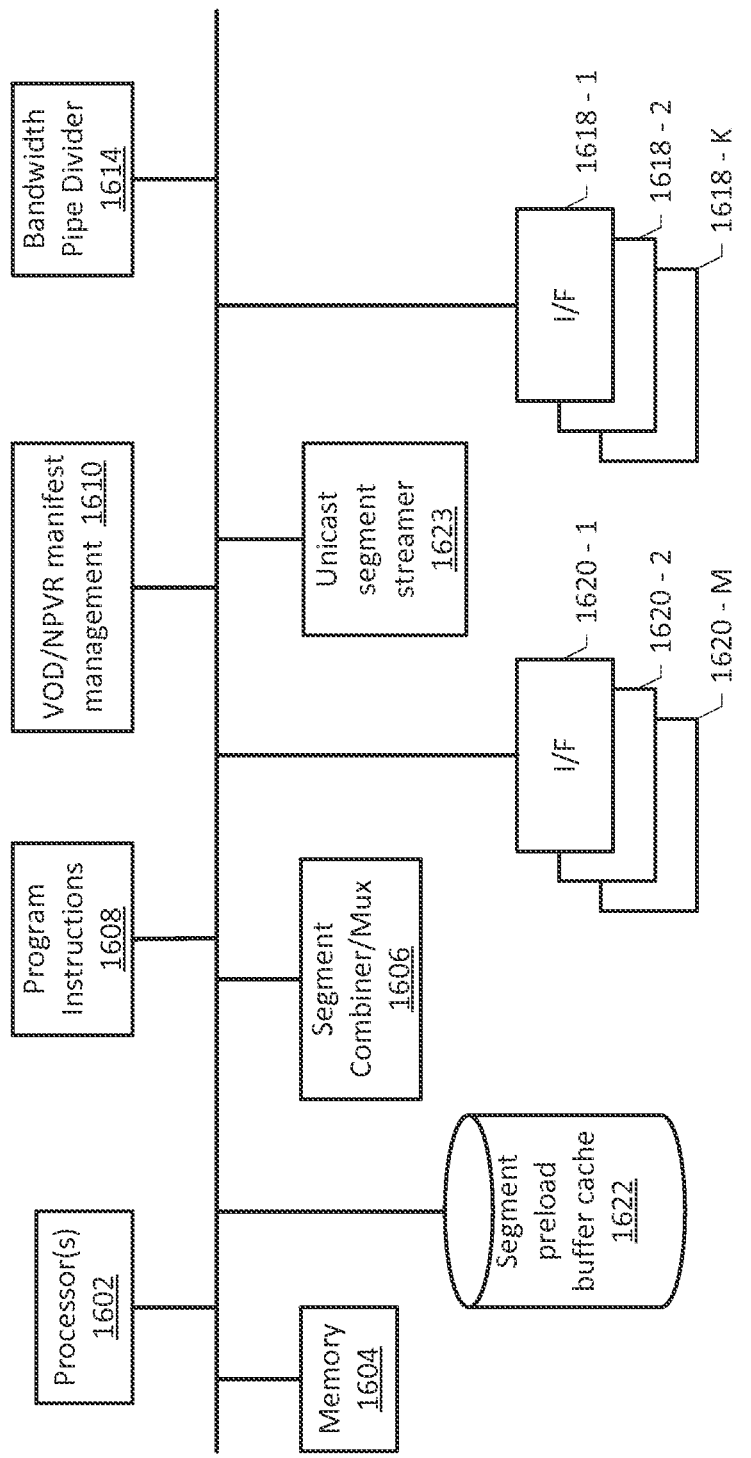
FIG. 16 depicts a block diagram of an example edge delivery node of a CDN operative in the SDV implementation of FIG. 9 according to an embodiment of the present patent application.

FIG. 16 depicts a block diagram of an example edge delivery node 1600 of a CDN operative in the SDV implementation of FIG. 9 according to an embodiment of the present patent application. As before, one or more processors 1602 may be operatively coupled to various modules that may be implemented in persistent memory for executing suitable program instructions or code portions with respect to one or more processes set forth hereinabove for facilitating delivery of unicast streams of requested VOD sessions. A unicast segment streamer 1623 is operative in conjunction with a segment combiner and remux module 1606 to provide stitched/de-gapped unicast streams to a unicast switch for VOD delivery. A VOD/NPVR manifest management module 1610 is operative to provide appropriate manifest information to an SRM/ERM node under suitable program instructions, e.g., program instructions 1608 and/or other code portions in memory 1604, executed by processors 1602. A segment preload buffer cache 1622 is operative to store VOD content segments retrieved from codec-based content databases (shown in FIG. 9) prior to loading, whereby content segments at appropriate bitrates can be muxed for streaming. Appropriate interfaces (I/F) 1620-1 to 1620-M are operative to effectuate communications with encoded VOD content asset databases, NFS storage, and other CDN nodes. In similar fashion, interfaces 1618-1 to 1618-K are operative to effectuate communications with SDV nodes, e.g., SRM/ERM nodes, unicast switches, stream processor nodes, and the like.

Figure 17:
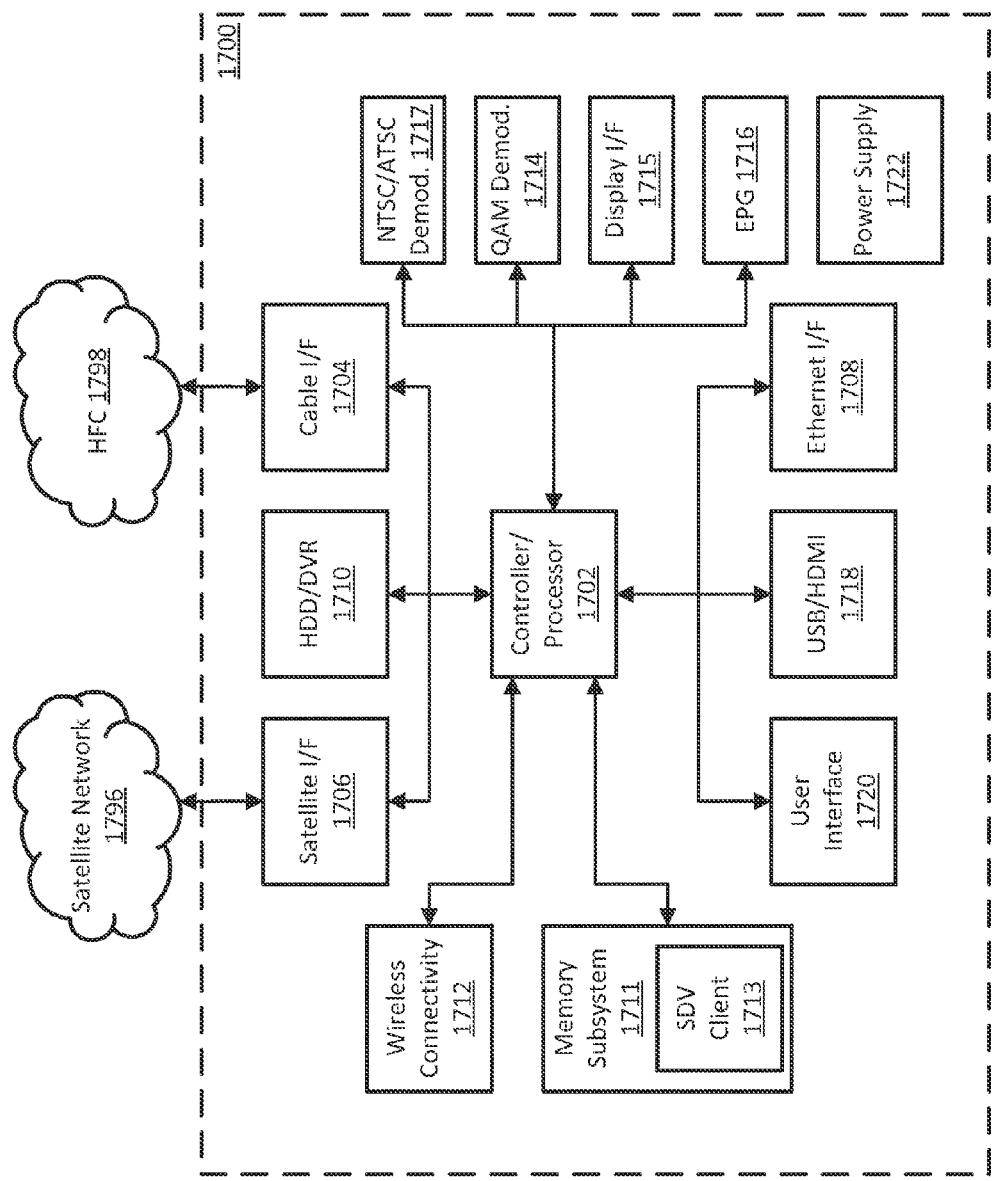
FIG. 17 depicts a block diagram of an example subscriber station (e.g., STB) according to an embodiment of the present patent application.

FIG. 17 depicts a block diagram of an example subscriber station (e.g., STB) 1700 according to an embodiment of the present patent application. STB 1700 is generally representative of subscriber stations 104-1 to 104-N shown in FIG. 1 or FIG. 9, and may include appropriate hardware/software components and subsystems configured for performing any of the device-side processes (either individually or in any combination thereof) with respect to generating channel/session requests and receiving appropriate responses described hereinabove. One or more microcontrollers/processors 1702 are provided for the overall control of the subscriber device 1700 and for the execution of various stored program instructions embodied in a persistent memory 1713 as an SDV client that may be part of a memory subsystem 1711 of the subscriber device 1700. Controller/processor complex referred to by reference numeral 1702 may also be representative of other specialty processing modules such as graphic processors, video processors, digital signal processors (DSPs), and the like, operating in association with suitable video and audio interfaces (not specifically shown). Appropriate interfaces such as cable TV I/F modules 1704 and satellite TV I/F modules 1706 involving tuners, demodulators, descramblers, MPEG/H.264/H.265 decoders/demuxes may be included for processing and interfacing with TV and other content signals received via an HFC network 1798 or a satellite network 1796. Example demodulators include QAM demodulator 1714 and NTSC/ATSC demodulator 1717. Other I/O or interfaces such as a display interface 1715, Electronic Program Guide (EPG) 1716, user interface 1720, USB/HDMI ports 1718, Ethernet I/F 1708, and short-range and wide area wireless connectivity interfaces 1712 are also provided. A hard disk drive (HDD) or DVR system 1710 is provided for mass storage of all sorts of program assets such as NV media, TV shows, movie titles, multimedia games, etc. Also included in the subscriber device 1700 is a suitable power supply block 1722, which may include AC/DC power conversion to provide power for the device 1700. It should be appreciated that the actual power architecture for the subscriber device 1700 may vary by the hardware platform used, e.g., depending upon the core SoC (System on Chip), memory, analog front-end, analog signal chain components and interfaces used in the specific platform, and the like.

Based upon the foregoing Detailed Description, it should be appreciated that one or more embodiments of the present disclosure can be advantageously implemented in a number of SDV environments for effectuating a more satisfactory delivery of guaranteed channels, non-guaranteed channels and VOD sessions using ABR pipe modeling principles set forth herein.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for providing adaptive bitrate (ABR) Video-on-Demand (VOD) content in a switched digital video (SDV) network to a subscriber station, the method comprising:
   receiving a notification from a VOD back office pursuant to a request received from the subscriber station to initiate a VOD session for a VOD asset provided as segmented multiple adaptive bitrate (ABR) representations that are encoded at different bitrates;
   interrogating a headend node to obtain coder-decoder (codec) capabilities of the subscriber station with respect to the multiple ABR representations of the VOD asset encoded at different bitrates;
   obtaining a manifest for the requested VOD asset based on quality of service and codec capabilities of the subscriber station, wherein the manifest includes references to the multiple ABR representations of the requested VOD asset encoded at different bitrates;
   filtering bitrates of the multiple ABR representations of the requested VOD asset referenced in the manifest based on requested quality and providing the filtered bitrates for modeling a bandwidth pipe corresponding to each edge quadrature amplitude modulator (QAM) device operative to support VOD sessions by taking into account adding ABR representations of the filtered bitrates based on the requested quality of the VOD asset in order to determine which edge QAM devices can accommodate the requested VOD asset;
   storing a bandwidth pipe distribution for a subset of edge QAM devices obtained responsive to the bandwidth pipe modeling for each of the edge QAM devices determined to accommodate the requested VOD asset that is to be streamed;
   computing a crowding metric for each of the edge QAM devices capable of accommodating the requested VOD asset and selecting a particular edge QAM with a lowest crowding metric value;
   selecting correct bitrates of unicast adaptive bitrate (UABR) streams of existing VOD sessions from respective multiple ABR representations, the existing VOD sessions streaming via the particular edge QAM device selected to accommodate a particular UBAR stream having a select bitrate associated with the requested quality for the requested VOD asset;
   effectuating UABR allocations of the bandwidth pipe of the particular edge QAM device for the existing VOD sessions and the requested VOD asset, the UABR allocations being effectuated responsive to the selected bitrates of the UABR streams of the existing VOD sessions and the selected bitrate representation of the requested VOD asset; and
   sending a response message including one or more VOD session frequencies to the requesting subscriber station.

2. The method as recited in claim 1, wherein the particular UABR stream of the requested VOD asset is compliant with at least one of a Moving Pictures Expert Group (MPEG) codec, an MPEG-2 codec, an MEPG-4 codec, an H.264 codec and an H.265 codec.

3. The method as recited in claim 1, wherein the particular edge QAM device is one of a dedicated QAM for VOD sessions and a shared QAM supporting guaranteed channels, non-guaranteed channels, broadcast channels as well as VOD sessions.

4. The method as recited in claim 1, wherein the bandwidth pipe modeling of each edge QAM device further comprises:
generating a list of applied VOD sessions including currently streaming sessions;
sorting the list of VOD sessions in a descending order based on a priority value for bitrate upgrading; and
simulating, for each edge QAM, network bandwidth states responsive to adding the requested VOD asset.

5. The method as recited in claim 1, wherein the particular UABR stream of the requested VOD asset is one of a Standard Definition (SD), High Definition (HD) and Ultra High Definition (UHD) stream.

6. The method as recited in claim 1, wherein the request for a VOD asset and the response message are communicated via an HFC return channel signaling path.

7. The method as recited in claim 1, wherein the request for a VOD asset and the response message are communicated via a two-way communications network controller associated with the subscriber station.

8. The method as recited in claim 1, wherein the particular UABR stream of the requested VOD asset is delivered from an edge delivery node of a content delivery network.

9. An apparatus for providing adaptive bitrate (ABR) Video-on-Demand (VOD) content in a switched digital video (SDV) network to a subscriber station, the apparatus comprising:
a resource manager node, responsive to a notification from a VOD back office pursuant to a request received from the subscriber station to initiate a VOD session for a VOD asset provided as segmented multiple adaptive bitrate (ABR) representations that are encoded at different bitrates, programmed to:
interrogate a headend node to obtain coder-decoder (codec) capabilities of the subscriber station with respect to the multiple ABR representations of the VOD asset encoded at different bitrates;
obtain a manifest for the requested VOD asset based on quality of service and coder-decoder (codec) capabilities of the subscriber station, wherein the manifest includes references to the multiple ABR representations of the requested VOD asset encoded at different bitrates;
filter bitrates of the multiple ABR representations of the requested VOD asset referenced in the manifest based on requested quality and provide the filtered bitrates for modeling a bandwidth pipe corresponding to each edge quadrature amplitude modulator (QAM) device operative to support VOD sessions by taking into account adding ABR representations of the filtered bitrates based on the requested quality of the VOD asset in order to determine which edge QAM devices can accommodate the requested VOD asset;
store a bandwidth pipe distribution for a subset of edge QAM devices obtained responsive to the bandwidth pipe modeling for each of the edge QAM devices determined to accommodate the requested VOD asset that is to be streamed; and
compute a crowding metric for each of the edge QAM devices capable of accommodating the requested VOD asset and select a particular edge QAM device having a lowest crowding metric value; and
a stream processor node, responsive to the bandwidth pipe modeling of the particular edge QAM device provided by the resource manager node, programmed to:
select correct bitrates of unicast adaptive bitrate (UABR) streams of existing VOD sessions from respective multiple ABR representations, the existing VOD sessions streaming via the particular edge QAM device selected to accommodate a particular UABR stream having a select bitrate associated with the requested quality for the requested VOD asset; and
effectuate UABR allocations of the bandwidth pipe of the particular QAM device for the existing VOD sessions and the requested VOD asset in order to facilitate streaming of the sessions via the particular edge QAM device, wherein the UABR allocations are effectuated responsive to the selected bitrates of the UABR streams of the existing VOD sessions and the selected bitrate representation of the requested VOD asset.

10. The apparatus as recited in claim 9, wherein the resource manager node is further programmed to obtain the codec capabilities of the subscriber station from a cable headend.

11. The apparatus as recited in claim 9, wherein the particular UABR stream of the requested VOD asset is compliant with at least one of a Moving Pictures Expert Group (MPEG) codec, an MPEG-2 codec, an MEPG-4 codec, an H.264 codec and an H.265 codec.

12. The apparatus as recited in claim 9, wherein the stream processor node is programmed to join the particular UABR stream to an edge QAM device comprising one of a dedicated QAM for VOD sessions and a shared QAM supporting guaranteed channels, non-guaranteed channels, broadcast channels as well as VOD sessions.

13. The apparatus as recited in claim 9, wherein the resource manager node includes a QAM bandwidth pipe modeling block programmed to:
generate a list of applied VOD sessions including currently streaming sessions;
sort the list of VOD sessions in a descending order based on a priority value for bitrate upgrading; and
simulate, for each edge QAM, network bandwidth states responsive to adding the requested VOD asset.

14. The apparatus as recited in claim 9, wherein the particular UABR stream for the requested VOD asset is one of a Standard Definition (SD), High Definition (HD) and Ultra High Definition (UHD) stream.

15. The apparatus as recited in claim 9, wherein the resource manager node comprises a session resource manager (SRM) node, an edge resource manager (ERM) node, or a combination of the SRM and ERM nodes.

16. The apparatus as recited in claim 9, wherein the resource manager node is further programmed to send a response message including one or more VOD session frequencies to the requesting subscriber station.

17. The apparatus as recited in claim 9, wherein the resource manager node and the stream processor node are integrated as an SDV server platform.

* * * * *